US008744732B2

(12) United States Patent  (10) Patent No.: US 8,744,732 B2
Matsuda                    (45) Date of Patent:     Jun. 3, 2014

(54) VEHICLE AND ENGINE CONTROLLING METHOD

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 528 days.

(21) Appl. No.: 12/980,212

(22) Filed: Dec. 28, 2010

(65) Prior Publication Data
US 2011/0160976 A1 Jun. 30, 2011

(30) Foreign Application Priority Data

Dec. 28, 2009 (JP) ................................. 2009-297728
Dec. 29, 2009 (JP) ................................. 2009-299022

(51) Int. Cl.
B60K 6/00 (2006.01)
B60W 10/06 (2006.01)

(52) U.S. Cl.
USPC ........ 701/112; 701/113; 123/179.3; 123/491; 477/203

(58) Field of Classification Search
USPC ......... 701/112, 113; 123/179.3, 491; 477/203
See application file for complete search history.

(56) References Cited

U.S. PATENT DOCUMENTS

2003/0004635 A1* 1/2003 Kamiya et al. ................ 701/112
2009/0037085 A1* 2/2009 Kojima ......................... 701/113

FOREIGN PATENT DOCUMENTS

| JP | 56146030 A | 11/1981 |
| JP | 03202641 A | 9/1991 |
| JP | 06229361 A | 8/1994 |
| JP | 07269385 A | 10/1995 |
| JP | 2002213268 A | 7/2002 |
| JP | 2003049684 A | 2/2003 |
| JP | 2003291693 A | 10/2003 |
| JP | 2005-076600 A | 3/2005 |
| JP | 2005155399 A | 6/2005 |
| JP | 2009299654 A | 12/2009 |

* cited by examiner

Primary Examiner — Adam Tissot
(74) Attorney, Agent, or Firm — Alleman Hall McCoy Russell & Tuttle LLP

(57) ABSTRACT

A vehicle comprises an acceleration command input device operated by a driver to input an acceleration command; a braking command input device operated by the driver to input a braking command; and an engine controller for controlling a plurality of engine control components to change an engine driving power in response to the acceleration command and executing a deceleration control for reducing the engine driving power when a predetermined deceleration condition is met; the engine controller executing driving power increasing preparation for changing a controlled amount of at least one of the engine control components to increase the engine driving power while maintaining the deceleration control state when inputting of the braking command stops during the deceleration control, and changing a controlled amount of at least one of the engine control components to increase the engine driving power when the acceleration command is input thereafter.

24 Claims, 18 Drawing Sheets

VEHICLE AND ENGINE CONTROLLING METHOD

CROSS-REFERENCE TO RELATED APPLICATION

This application claims priority to and the benefit of Japanese Patent Application No. 2009-297728, filed on Dec. 28, 2009 and Japanese Patent Application No. 2009-299022, filed on Dec. 29, 2009, the entire disclosures of which are incorporated herein by reference.

BACKGROUND OF THE INVENTION

1. Field of the Invention

The present invention relates to a vehicle and an engine controlling method, in which a plurality of engine control components are controlled in accordance with an acceleration command input by a driver to change an engine driving power.

2. Description of the Related Art

Generally, a reference value of an amount of a fuel fed to an engine is predetermined so as to correspond to an engine speed and a throttle valve opening degree. A controller for controlling an operation of the engine is configured to decide the fuel feed amount predetermined as the reference value based on the engine speed, the throttle valve opening degree, and other values received from sensors, and cause an injector to inject a fuel to an intake-air in an air-intake passage with the decided fuel feed amount. In an engine mounted in a recent vehicle, a fuel stop control for stopping fuel injection to the engine is executed when a throttle valve is closed and a vehicle is decelerated, for the purpose of improving a fuel efficiency, and other purposes, and fuel injection is resumed when the throttle valve is opened (see Japanese Laid-Open Patent Application Publication No. 2005-76600).

During the fuel stop control, a fuel adhering to an air-intake pipe before the fuel stop is suctioned into the engine and the air-intake pipe is dried. In a normal state, an air-fuel ratio is set such that a fuel in an air-fuel mixture is rich. When the throttle valve is opened and the fuel injection is resumed to accelerate the vehicle in a fuel stop control state, the injected fuel adheres to the dried air-intake pipe, so that the fuel in the air-fuel mixture suctioned into the engine becomes lean for a moment and becomes rich thereafter. Under this condition, the engine driving power fluctuates when the fuel injection is resumed and the vehicle is accelerated, which degrades drivability. For example, during cornering, a driver feels nervous about a vehicle body vibration, etc. Therefore, there is a need to suppress a fluctuation in the engine driving power which would occur when the fuel injection is resumed in the fuel stop state.

In a state where a throttle valve opening degree is small, combustion energy is smaller than a mechanical resistance of the engine. A crankshaft rotates by an inertia force transmitted from a drive wheel When the throttle valve is closed to decelerate the vehicle in a high engine speed condition during driving, combustion does not occur in the engine due to a deficiency of an air-intake amount. When the throttle valve is opened to accelerate the vehicle under this state, an engine suddenly transitions from a non-combustion state to a combustion state. This makes drivability worse.

SUMMARY OF THE INVENTION

The present invention addresses the above described conditions, and an object of the present invention is to improve drivability when a vehicle is transitioning from a decelerated state to an accelerated state.

According to an aspect of the present invention, a vehicle comprises an acceleration command input device operated by a driver to input an acceleration command; a braking command input device operated by the driver to input a braking command; and an engine controller for controlling a plurality of engine control components to change an engine driving power in response to the acceleration command and executing a deceleration control for reducing the engine driving power when a predetermined deceleration condition is met; the engine controller executing driving power increasing preparation for changing a controlled amount of at least one of the engine control components to increase the engine driving power while maintaining a state of the deceleration control when it is determined that inputting of the braking command stops during the deceleration control, and changing a controlled amount of at least one of the engine control components to increase the engine driving power when it is determined that the acceleration command is input after the driving power increasing preparation.

The inventors noted that when the vehicle is decelerated using a brake and then re-accelerated, the driver usually performs an operation for accelerating the vehicle after a lapse of a time after the driver stops a braking operation. In other words, a timing when the driver performs the acceleration operation is not known in advance but a timing before the timing of the acceleration operation can be specified by detecting a time point when the braking operation is stopped. In accordance with the above configuration, since the driving power increasing preparation for changing the controlled amount of at least one of the engine control components to increase the engine driving power is performed while maintaining the deceleration control state, a responsiveness of the engine can be improved and a rapid change in the engine driving power can be prevented, when the acceleration command is input thereafter. As a result, drivability in a case where the vehicle is transitioning from a decelerated state to an accelerated state can be improved.

In the driving power increasing preparation, it is desirable to change the controlled amount of the engine control component while maintaining a state where the vehicle speed does not increase. For example, the controlled amount of the engine control component may be increased to increase the engine driving power while maintaining non-combustion in the expansion stroke of the engine. For example, the controlled amount of the engine control component may be increased to increase the engine driving power while maintaining a state where a crankshaft of the engine is driven due to a rotational inertia force of the drive wheel, i.e., an engine braking state is maintained. As the controlled amount, for example, a desired controlled amount, a throttle valve opening degree, a fuel injection amount, an ignition timing, restoring of ignition of a cylinder in which ignition paused in its expansion stroke, an exhaust valve opening degree, or a supercharging amount, may be used, so long as it can change the engine driving power.

The engine control components may include a fuel feeder for controlling fuel feeding to the engine. The deceleration condition may include a predetermined fuel stop condition. The deceleration control may include a fuel stop control for stopping fuel feeding to the engine when the predetermined fuel stop condition is met. The engine controller may cause the fuel feeder to resume fuel feeding to the engine in the driving power increasing preparation, when it is determined that inputting of the braking command stops, during the fuel stop control.

In accordance with this configuration, since the fuel feeding to the engine is resumed when it is determined that inputting of the braking command stops during the fuel stop control, a fuel is allowed to adhere onto a dried air-intake pipe prior to the acceleration operation, and a fluctuation in the engine driving power due to a change in an air-fuel ratio can be suppressed. Therefore, the fuel stop control is executed and a fluctuation in the engine driving power can be suppressed. As a result, improvement of fuel efficiency and drivability can be achieved.

The engine control components may include a valve actuator for driving a throttle valve for controlling an air-intake amount to the engine. The engine controller may cause the valve actuator to increase an opening degree of the throttle valve in the driving power increasing preparation, when it is determined that inputting of the braking command stops, during the deceleration control.

In accordance with this configuration, since the opening degree of the throttle valve is increased when it is determined that inputting of the braking command stops during the deceleration control, the air-intake amount is increased prior to the acceleration operation performed by the driver, which improves a responsiveness of the engine driving power to the driver's acceleration operation. By doing so, it is possible to avoid an event that the engine driving power suddenly increases after a lapse of a time after a time point when the acceleration operation starts, and suppress a fluctuation in the engine driving power. As a result, a fluctuation in the engine driving power which would occur when the vehicle is transitioning from a decelerated state to an accelerated state can be suppressed and drivability can be improved.

The vehicle may further comprise a braking amount sensor for detecting a braking amount of the braking command; and the engine controller may determine that inputting of the braking command stops when the braking amount detected by the braking amount sensor reaches a value which is not less than a predetermined threshold and then a value less than the predetermined threshold.

In accordance with this configuration, it can be easily determined that the braking command is input and then inputting of the braking command is stopped.

The vehicle may further comprise an anti-lock braking system. The engine controller may determine that inputting of the braking command stops, based on a value detected by a brake pressure sensor in the anti-lock braking system.

In accordance with this configuration, since the brake pressure sensor in the anti-lock braking system is used as the sensor used to determine whether or not inputting of the braking command stops, the number of components and a manufacturing cost can be reduced.

The engine controller may execute the driving power increasing preparation after a lapse of a predetermined delay time after a time point when it is determined that inputting of the braking command stops.

In accordance with this configuration, a time period between a time point when the driving power increasing preparation starts and a time point when the engine driving power increases thereafter in response to the acceleration command input is short. This prevents the driving power increasing preparation from lasting for a long time unnecessarily. By controlling the delay time, a time from when the driving power increasing preparation starts until the acceleration command is input is controlled, and therefore an amount of the engine driving power increased after the driving power increasing preparation can be controlled. Note that the delay time may be set based on specified control parameters.

The vehicle may further comprise a driving state detecting sensor for detecting a driving state of the vehicle; and the engine controller may decide the delay time according to a value detected by the driving state detecting sensor.

In accordance with this configuration, since the delay time is controlled according to the driving state during the deceleration control, the driving power increasing preparation can be executed so that the vehicle is re-accelerated according to the driving state at that point of time.

The driving state may include at least one of a braking amount, a braking amount change rate, an engine speed and a driving speed; and the engine controller may set the delay time shorter when a value of at least one of the braking amount, the braking amount change rate, the engine speed and the driving speed is larger.

In accordance with this configuration, a desired acceleration capability according to the driving state is attained. When the braking amount, the braking amount change rate, the engine speed, or the driving speed is large, the driving speed decreases significantly. More often than not, after that, it is desired that the engine E be accelerated quickly. Therefore, by setting the delay time shorter, i.e., a time from when the driving power increasing preparation starts until the acceleration command is input longer, when at least one of the braking amount, the braking amount change rate, the engine speed, and the driving speed, is larger, the controlled amount of the engine control component can be changed sufficiently to increase the engine driving power, and acceleration can occur quickly thereafter.

The driving state may include a gear position set in a transmission; and the engine controller may set the delay time longer when the gear position is 1st gear with a highest reduction gear ratio than when the gear position is other than 1st gear.

A torque generated in the engine is high when the gear position set in the transmission is 1st gear with a highest reduction gear ratio. The delay time is set longer, i.e., from a time when the driving power increasing preparation starts until the acceleration command input is shorter, for 1st gear with a highest reduction gear ratio than for other gear positions to suppress a torque from increasing excessively when acceleration re-starts. As a result, a stable acceleration is achieved.

The engine may include a plurality of cylinders; and the engine controller may make timing when the driving power increasing preparation starts different between the plurality of cylinders.

In accordance with this configuration, the engine driving power changes smoothly, when the vehicle is accelerated after the driving power increasing preparation, which improves driving feel.

The vehicle may further comprise a driving state detector for detecting whether a driving state of the vehicle is a value corresponding to a lower speed or a higher speed than a predetermined state, the engine may include a plurality of cylinders; the engine control components may be provided for each cylinder such that driving powers of the plurality of cylinders are respectively independently controlled; and the engine controller may control the engine control components such that a driving power of a part of the plurality of cylinders is smaller than a driving power of another cylinder, when it is determined that the driving state detected by the driving state detector is a value corresponding to a lower speed than the predetermined state. The phrase "the driving state is a value corresponding to a lower speed than the predetermined state" is meant to include a case when a lower gear (with a higher reduction gear ratio) is set in the transmission, a throttle valve opening degree is smaller, etc, as well as a case where an actual driving speed of the vehicle is lower.

Even when a non-combustion state generated by reducing the air-intake amount to the engine transitions to a combustion state due to an increase in the air-intake amount, a change in the driving power mainly occurs in another cylinder at that point of time, because the driving power of a part of the cylinders is small when the driving state is a value corresponding to a lower speed. Therefore, a fluctuation in the driving power in the case where the vehicle is transitioning from a decelerated state to an accelerated state can be lessened in an overall engine. Although the driving power of another cylinder may be large as compared to a case where all of the cylinders output an equal driving power when the driving state is a value corresponding to a lower speed, another cylinder is operative in a high-driving power range with a higher efficiency even when the driving state is a value corresponding to a lower speed in an engine configured such that a combustion efficiency in the high driving power range is higher like a motorcycle, for example. Therefore, energy efficiency in the overall engine can be improved. For example, in a rear-wheel-drive vehicle, a wheelie in which the front wheel lifts off the ground, could possibly occur when the vehicle is rapidly accelerated in a stopped state or a low-speed state. However, occurrence of the wheelie could be prevented because the driving power of a part of the cylinders is lessened, when the driving state is a value corresponding to a lower speed.

The vehicle may further comprise a transmission coupled to the engine. The driving state detector may include a gear position sensor for detecting a gear position set in the transmission as the driving state. The engine controller may control the engine control components so that a driving power of a part of the cylinders is smaller than a driving power of another cylinder when the gear position detected by the gear position sensor is a value corresponding to a lower speed than the predetermined position.

In accordance with this configuration, the engine control components are controlled according to the gear position so that the driving power of a part of the cylinders is smaller than that of another cylinder. When the gear position is changed, some impact is generated in the vehicle, and the impact generated is absorbed when a state where all of the cylinders output substantially an equal driving power transitions to a state where the driving power of a part of the cylinders is smaller than the driving power of another cylinder (or reversed phenomenon), thereby maintaining a good driving feel. Since the driving power of a part of the cylinders is made smaller when the gear position is lower, i.e., an output toque of the transmission is high, a traction capability is improved in the case of the vehicle.

The engine controller may cause the engine control components corresponding to the part of the cylinders to attain a predetermined driving power suppressed state while maintaining a state where the engine control components corresponding to another cylinder is operative in response to the acceleration command, when the driving state detected by the driving state detector is a value corresponding to a lower speed than the predetermined state.

Even when the vehicle is transitioning from a non-combustion state to a combustion state, a change in the engine driving power mainly occurs in another cylinder, because a part of the cylinders is placed in a driving power suppressed state, in the above configuration. Therefore, a fluctuation in the driving power in the case where the vehicle is transitioning from a decelerated state to an accelerated state can be reduced in an overall engine. Since a part of the cylinders is placed in the driving power suppressed state, another cylinder must output a higher driving power, to attain in the overall engine, a driving power as high as the driving power in a case where all the cylinders in the engine output an equal driving power. In an engine configured such that combustion efficiency in the high driving power range is higher like a motorcycle, for example, another cylinder is operative in a high-driving power range with a higher efficiency even when the driving state is a value corresponding to a lower speed. Therefore, energy efficiency in the overall engine can be improved.

The engine control components may include a valve actuator for driving a throttle valve for controlling an air-intake amount of a cylinder, an igniter for performing ignition in the cylinder and a fuel feeder for feeding a fuel to the cylinder; and the predetermined driving power suppressed state may be at least one of a state where an opening degree of the throttle valve corresponding to the part of the cylinders is an idling opening degree corresponding to an idling engine speed or a restricted opening degree close to the idling opening degree, a state where ignition pauses in an expansion stroke of the part of the cylinders, and a state where fuel feeding to the part of the cylinders is stopped.

In accordance with this configuration, a driving power of a part of the cylinders is substantially stopped, and therefore, reduction of a fluctuation in the driving power and improvement of energy efficiency in the overall engine can be suitably achieved.

The number of the part of the cylinders may be less than the number of other cylinders.

In accordance with this configuration, reduction of a fluctuation in the driving power and improvement of energy efficiency in the overall engine can be suitably achieved, while avoiding a deficiency of the engine driving power.

The vehicle may transmit the engine driving power to a drive wheel, expansion strokes of the entire plurality of cylinders may be set at equal intervals, and expansion strokes of other cylinders may be set at unequal intervals.

In accordance with this configuration, when it is detected that the driving state is a value corresponding to a lower speed, the expansion strokes in the engine are caused to occur at unequal intervals. Therefore, a wheel slip is less likely to occur when the driving state is a value corresponding to a lower speed and the torque of the drive wheel is likely to increase, and as a result, a traction capability of the drive wheel can be improved.

The engine controller may control the engine control components such that the driving power of the part of the cylinders is smaller as the driving state detected by the driving state detector is a value corresponding to a lower speed.

In accordance with this configuration, since the driving power of a part of the cylinders gradually decreases according to the driving state, a fluctuation in the driving power is suppressed when the driving state changes. As a result, a driving feel can be improved.

The vehicle may further comprise a bank angle sensor for detecting a bank angle of a vehicle body which tilts laterally with respect to a substantially upright position of the vehicle body, the vehicle may be a motorcycle; and the engine controller may control the engine control components such that the driving power of the part of the plurality of cylinders is smaller than the driving power of another cylinder, when the bank angle detected by the bank angle sensor reaches a value which is not less than a predetermined angle and then a value less than the predetermined angle.

In accordance with this configuration, when the vehicle enters a corner and exits the corner, a fluctuation in the driving power is suppressed in the overall engine. Therefore, drivability during cornering when the driver feels nervous can be improved.

According to another aspect of the present invention, a method of controlling an engine comprises the steps of: controlling a plurality of engine control components to reduce an engine driving power when a predetermined deceleration condition is met; changing a controlled amount of at least one of engine control components to perform driving power increasing preparation (driving power increasing preparation step) when inputting of a braking command by a driver stops after start of the step of controlling the plurality of engine control components to reduce the engine driving power; and increasing a controlled amount of at least one of the engine control components to increase the engine driving power (driving power increasing step) in response to an acceleration command input by the driver, after start of the step of changing the controlled amount of at least one of engine control components to perform the driving power increasing preparation.

In accordance with the above method, it may be predicted that the acceleration command is input by the driver prior to actually inputting of the acceleration command, by determining that inputting of the braking command stops during the deceleration control. By doing so, the engine control can start prior to actually inputting of the acceleration command, and engine responsiveness can be improved or a rapid change in the engine driving power can be prevented, as compared to a case where the engine control starts after the acceleration command is input. As a result, drivability in a case where the vehicle is transitioning from a decelerated state to an accelerated state can be improved.

In the step of changing the controlled amount of at least one of engine control components to perform the driving power increasing preparation, the controlled amount may be made different for each driving state of the vehicle.

In accordance with this method, a controlled amount can be changed suitably according to the driving state, and a driving feel can be improved. For example, in a driving state where acceleration desirably occurs quickly, a change in the controlled amount in the driving power increasing preparation step may be set so as to increase a driving power increasing amount in the driving power increasing step. In a driving state where a sudden fluctuation in the driving power in the driving power increasing step is desirably suppressed, a change in the controlled amount in the driving power increasing preparation step may be set so as to decrease a driving power increasing amount in the driving power increasing step. The term "controlled amount" is meant to include a fuel feed amount, a throttle valve opening degree and a delay time.

The above and further objects and features of the invention will be more fully apparent from the following detailed description with reference to the accompanying drawings.

DETAILED DESCRIPTION OF THE PREFERRED EMBODIMENTS

Hereinafter, embodiments of the present invention will be described with reference to the drawings. Throughout the drawings, the same or corresponding constituents are designated by the same reference symbols and will not be described repetitively. The stated directions are referenced from the perspective of a driver straddling the motorcycle unless otherwise explicitly noted. Although the present invention is applied to a motorcycle by way of example, the present invention is applicable to vehicles driving with wheels, such as a four-wheeled vehicle or a straddle-type vehicle having a seat straddled by a driver. The straddle-type vehicle includes a motorcycle, an ATV (all terrain vehicle), etc.

Embodiment 1

Figure 1:
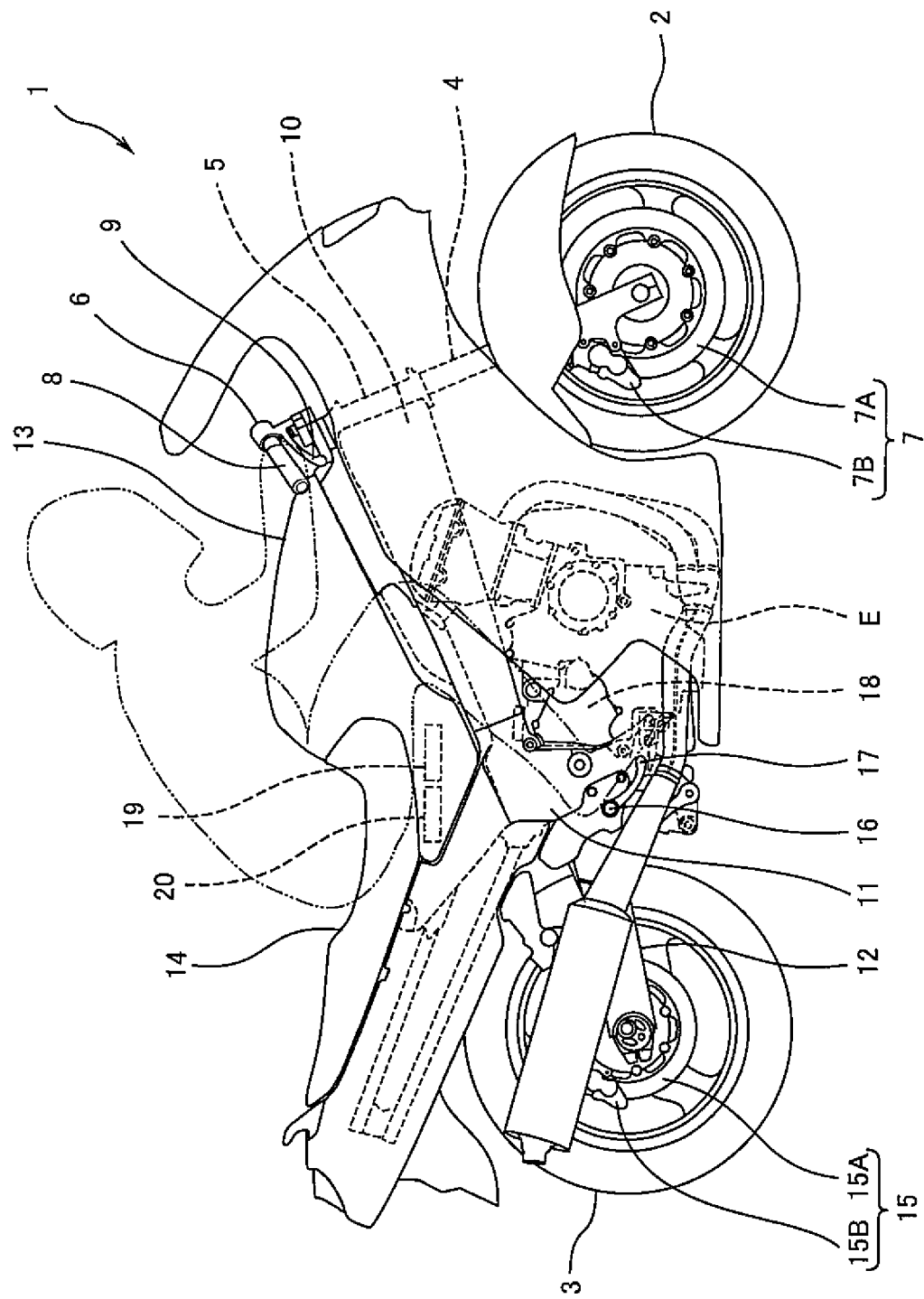
FIG. 1 is a right side view showing a motorcycle according to Embodiment 1 of the present invention.

FIG. 1 is a right side view of a motorcycle 1 according to Embodiment 1 of the present invention. Referring to FIG. 1, the motorcycle 1 includes a front wheel 2 which is a driven wheel at a front of the motorcycle and a rear wheel 3 which is a drive wheel at a rear of the motorcycle. The front wheel 2 is rotatably attached to a lower end portion of a front fork 4 extending substantially vertically. The front fork 4 is mounted to a steering shaft (not shown) rotatably supported by a head pipe 5. A bar type handle 6 extending rightward and leftward is attached to the bracket.

Front wheel brake discs 7A are fastened to the right and left portions of the front wheel 2, respectively. A front wheel brake caliper 7B is mounted to the lower end portion of the front fork 4. The front wheel brake discs 7A and the front wheel brake caliper 7B constitute a front wheel brake 7. A piston (not shown) of the front wheel brake caliper 7B is pressed against the front wheel brake discs 7A by an oil pressure, thereby generating a braking force. A throttle grip 8 (acceleration command input device) is provided at a portion of the steering handle 6 which is gripped by the driver's right hand. By the driver's operation of the throttle grip 8, an acceleration command is input. The throttle grip 8 is rotated by twisting the driver's wrist to operate a throttle device 22 (see FIG. 2) as described later. A brake lever (braking command input device) 9 is provided in front of the throttle grip 8 to primarily activate the front wheel brake 7. By the driver's operation of the brake lever 9, a braking command is input.

A pair of right and left main frame members 10 extend rearward in a downward direction from the head pipe 5. A pair of right and left pivot frame members 11 are coupled to the rear portions of the main frame members 10, respectively. The front end portions of swing arms 12 extending substantially in the longitudinal direction of the motorcycle 1 are coupled to the pivot frame members 11, respectively such that each swing arm 12 is pivotable around the front end portion. The rear wheel 3 is rotatably mounted to the rear portion of the swing arm 12. A fuel tank 13 is provided behind the steering handle 6. A seat 14 straddled by the driver is provided behind the fuel tank 13. A rear wheel brake disc 15A is fastened to the right portion of the rear wheel 3. A rear wheel brake caliper 15B is mounted to the rear end portion of the swing arm 12. The rear brake disc 15A and the rear wheel brake caliper 15B constitute a rear wheel brake 15 (see FIG. 2). A piston (not shown) of the rear wheel brake caliper 15B is pressed against the rear wheel brake disc 15A by an oil pressure, thereby generating a braking force. Right and left steps 16 are respectively provided below and at right and left sides of the seat 14 to allow the driver's feet to rest thereon. A brake pedal 17 (braking command input device) extending forward is pivotally mounted to the right step 16. The driver depresses the brake pedal 17 to substantially activate the rear wheel brake 15.

An engine E is mounted to the main frame members 10 and the pivot frame members 11, between the front wheel 2 and the rear wheel 3. In FIG. 1, as the engine E, an inline four-stroke four-cylinder engine is depicted. A transmission 18 (see FIG. 2) is coupled to the output shaft of the engine E. A driving power is transmitted from the transmission 18 to the rear wheel 3 via a chain (not shown). The throttle device 22 (see FIG. 2) is disposed inward relative to the main frame members 10 and coupled to intake ports (not shown) of the engine E. An air cleaner 21 (see FIG. 2) is disposed below the fuel tank 13 and coupled to the upstream portion of the throttle device 22 (FIG. 2) in an air flow direction. The air cleaner 21 is configured to take in outside air by utilizing a ram pressure from forward. In an inner space below the seat 14, an engine ECU (Electronic Control Unit) 19 which is an engine controller, and an ABS (anti-braking system) ECU 20, etc., are accommodated.

Figure 2:
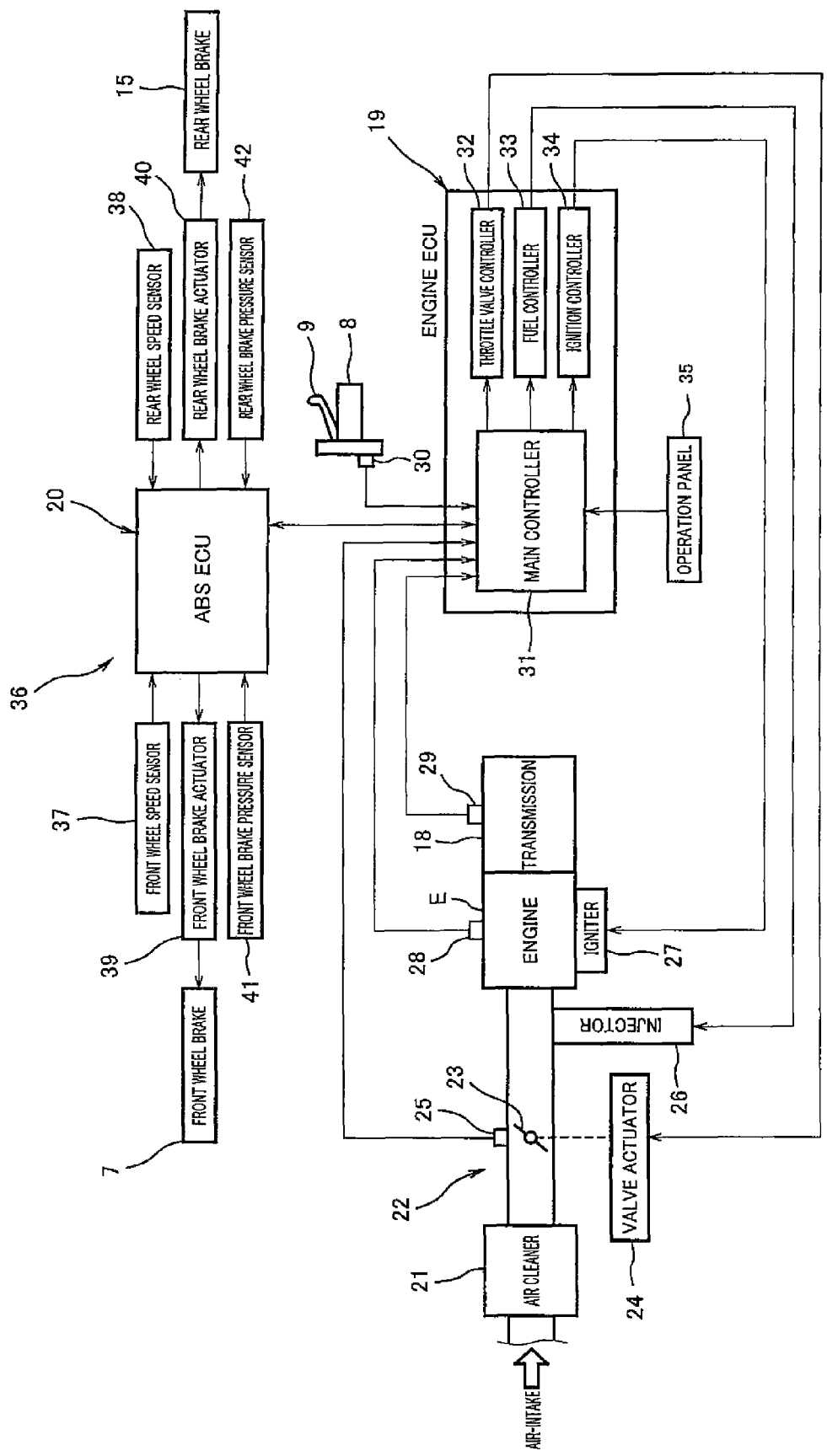
FIG. 2 is a block diagram showing a control system of the motorcycle in FIG. 1.

FIG. 2 is a block diagram showing a configuration of a control system built into the motorcycle 1 of FIG. 1. Referring to FIG. 2, the air cleaner 21 is coupled to intake ports (not shown) of the engine E via the throttle device 22. The throttle device 22 includes a throttle valve 23 which is provided within an air-intake passage and configured to control an air-intake amount. The throttle valve 23 is coupled to a valve actuator 24 (engine control component) including a motor controlled by the engine ECU 19 and is configured to be opened and closed by the valve actuator 24. The throttle valve 23 is provided with a throttle valve position sensor 25 configured to detect an opening degree of the throttle valve 23.

The throttle device 22 is provided with an injector 26 (engine control component) which is a fuel feeder configured to feed and inject a fuel to the air-intake passage. The engine E is provided with igniters 27 (engine control components) configured to ignite an air-fuel mixture inside the four cylinders. The crankshaft (not shown) of the engine E is attached with an engine speed sensor 28 configured to detect a rotation number of the crankshaft. The transmission 18 is coupled to the engine E and is configured to change a speed of an engine driving power and transmit it to the rear wheel 3. The transmission 18 is attached with a gear position sensor 29 (driving state detector) configured to detect a transmission gear position. The throttle grip 8 is attached with a grip position sensor 30 configured to detect an opening degree of the throttle grip 8.

The engine ECU 19 is constructed by a computer such as a microcomputer, memories, and others and is coupled to the throttle valve position sensor 25, the engine speed sensor 28, the gear position sensor 29 and the grip position sensor 30. The engine ECU 19 includes a main controller 31, a throttle valve controller 32, a fuel controller 33 and an ignition controller 34. The main controller 31 is configured to perform calculation and the like relating to engine control based on the signals received from the sensors 25, 28, 29 and 30. Based on data of the calculation made by the main controller 31, the throttle valve controller 32 controls the valve actuator 24 to control the opening degree of the throttle valve 23. Based on data of the calculation made by the main controller 31, the fuel controller 33 controls the injector 26. Based on data of the calculation made by the main controller 31, the ignition controller 34 controls the igniter 27. An operation panel 33 operated by the driver to input a command is coupled to the main controller 31.

The motorcycle 1 includes an electric motor braking system 36 operative as an anti-lock braking system. The electric motor braking system 36 includes the ABS ECU 20. A front wheel speed sensor 37 for detecting a rotation number of the front wheel 2 and a rear wheel speed sensor 38 for detecting a rotation number of the rear wheel 3 are coupled to the ABS ECU 20. A front wheel brake actuator 39 constituted by a hydraulic pump or the like for actuating the front wheel brake 7 (to be precise, front wheel brake caliper 7B), and a rear wheel brake actuator 40 constituted by a hydraulic pump or the like for actuating the rear wheel brake 15 (to be precise, rear wheel brake caliper 15B), are coupled to the ABS ECU 20. A front wheel brake pressure sensor 41 (braking amount sensor) for detecting a brake pressure (oil pressure) for actuating the front wheel brake 7 (to be precise, front wheel brake caliper 7B), and a rear wheel brake pressure sensor 42 (braking amount sensor) for detecting a brake pressure (oil pressure) for actuating the rear wheel brake 15 (to be precise, rear wheel brake caliper 15B) are coupled to the ABS ECU 20. In other words, each of the brake pressure sensors 41 and 42 serves to detect a braking amount corresponding to the braking command input by the driver. Instead of the brake pressure sensors, a brake stroke sensor for detecting an operation amount of the brake lever 9 or the brake pedal 17 may be used as a braking amount sensor.

Figure 3:
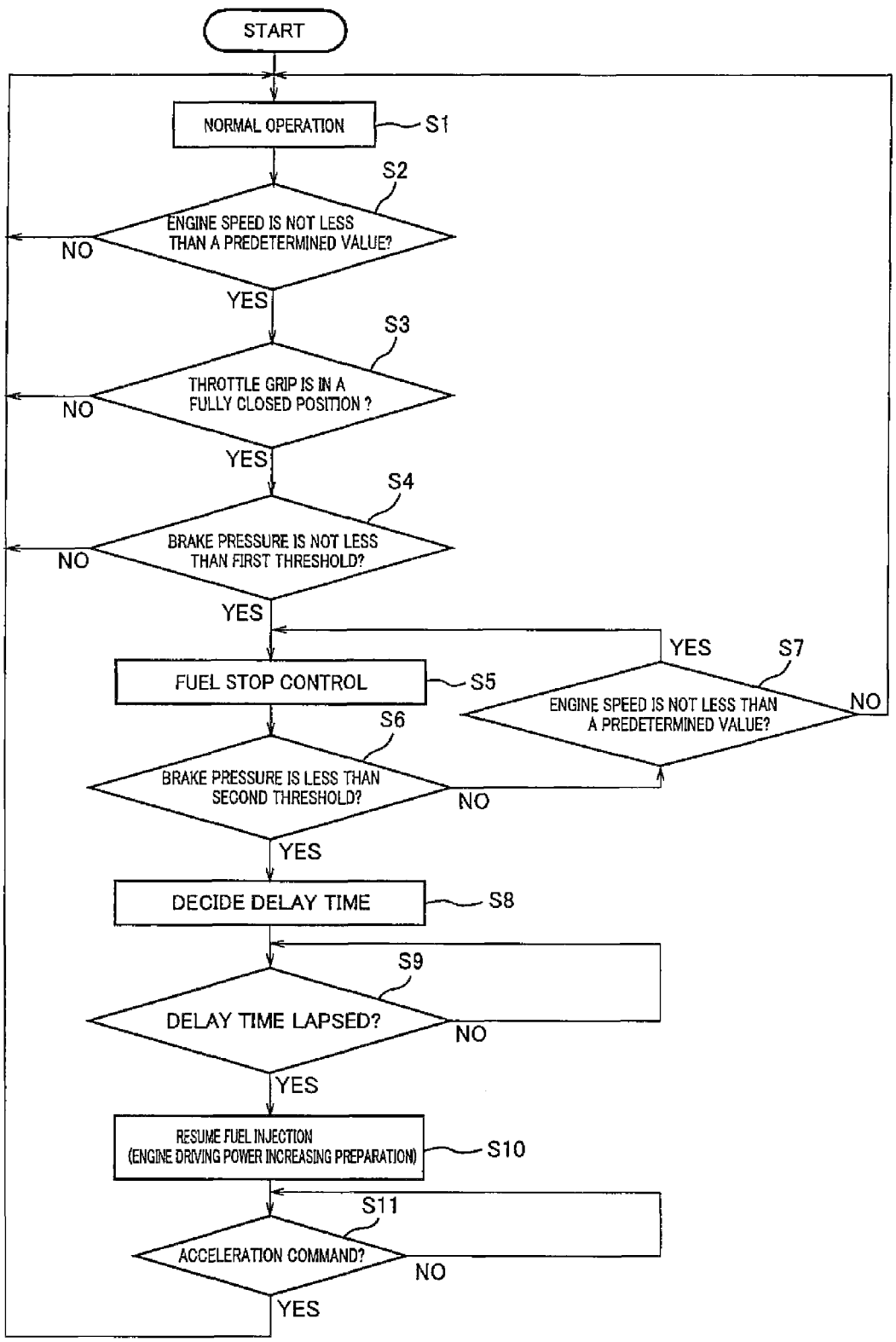
FIG. 3 is a flowchart showing a control process in the motorcycle in FIG. 2
Figure 4:
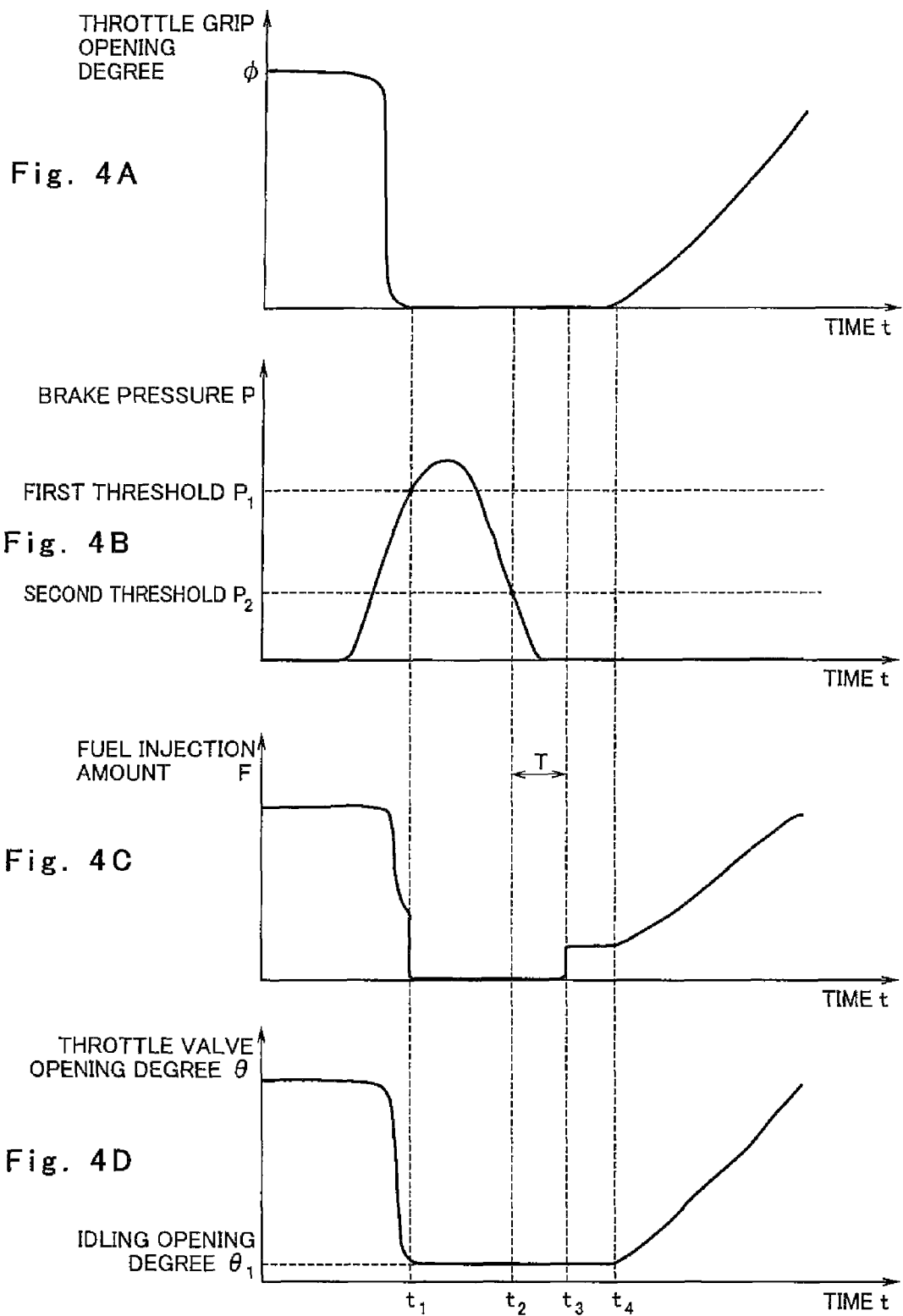
FIG. 4 is a graph showing the control process in FIG. 3.

FIG. 3 is a flowchart showing a control process in the motorcycle in FIG. 2. FIG. 4 is a graph showing the control process in FIG. 3. Hereinafter, the control process executed when the engine E is transitioning from a fuel stop state to an accelerated state will be described with reference to FIGS. 2 to 4. Upon the engine E staring to run, a normal operation starts (step S1). During the normal operation, the main controller 31 in the engine ECU 19 determines whether or not predetermined fuel stop conditions are met (step S1-step S3).

To be specific, initially, the main controller 31 in the engine ECU 19 determines whether or not the engine speed detected by the engine speed sensor 28 is not less than a predetermined value (e.g., 2000-2500 rpm) (step S2). If Yes in step S2, the main controller 31 determines whether or not a throttle grip opening degree φ detected by the grip position sensor 30 is an opening degree (zero or near zero) corresponding to a fully closed position of the throttle valve 23 (hereinafter this phrase is also recited as "throttle grip opening degree $\phi$ in the fully closed position") (step S3). The phrase "throttle grip opening degree $\phi$ in the fully closed position" means that the throttle grip 18 has been rotated to a position corresponding to the fully closed position of the throttle valve 23 and is in this position. When the throttle grip opening degree $\phi$ is in the fully closed position (zero or near zero), a throttle valve opening degree $\theta$ of the throttle valve 23 is controlled to reach an idling opening degree $\theta_1$ corresponding to an idling engine speed. If Yes in step S3, the main controller 31 determines whether or not a brake pressure P detected by the front wheel brake pressure sensor 41 or the rear wheel brake pressure sensor 42 is not less than a first threshold $P_1$ (step S4).

If Yes in step S4 (time $t_1$ in FIG. 4), it is determined that the fuel stop condition is met, and a fuel stop control is executed to decelerate the motorcycle 1 (step S5). The fuel stop control is defined as a deceleration control which forcibly stops fuel injection from the injector 26 to the air-intake passage to reduce the engine driving power. This can reduce unnecessary fuel consumption during deceleration, and achieve improvement of a fuel efficiency and reduction of the fuel gas. If No in any one of step S2-step S4, then the fuel stop control is not executed but the process returns top step S1, and the normal operation continues.

During the fuel stop control, the main controller 31 determines whether or not the brake pressure P detected by the front wheel brake pressure sensor 41 or the rear wheel brake pressure sensor 42 is less than a second threshold $P_2$ (step S6). The second threshold $P_2$ is larger than the first threshold $P_1$ but may be equal to the first threshold $P_1$. If No in step S6, the main controller 31 determines whether or not the engine speed detected by the engine speed sensor 28 is not less than a predetermined value (e.g., 2000-2500 rpm) (step S7). The predetermined value in step S7 may be equal to or different from the predetermined value in step S2.

If No in step S7, the engine speed is low and an engine stall is more likely to occur. Therefore, the engine E returns to the normal operation and the fuel injection is resumed (step S1). If Yes in step S7, the process returns to step S5 and the main controller 31 determines whether or not the brake pressure is less than the second threshold $P_2$ again (step S6). If Yes in step S6 (time $t_2$ in FIG. 4), it is determined that inputting of the braking command stops, i.e., the braking command is not input any more by the driver, and a delay time T is decided. The delay time T is defined as a time that lapses from when it is determined as Yes in step S6 until fuel injection is resumed. This makes it possible to improve fuel efficiency as compared to a case where the fuel injection is resumed substantially at the same time that it is determined that inputting of the braking command stops.

Then, it is determined whether or not the delay time T has lapsed from when it is determined that inputting of the braking command stops (step S9). If Yes in step S9 (time $t_3$ in FIG. 4), the injector 26 resumes the fuel injection with the throttle valve opening degree $\theta$ kept at the idling opening degree $\theta_1$ to perform an engine driving power increasing preparation step (step S10). When the fuel injection is resumed, the timing when the fuel injection is resumed may be made different between the four cylinders. By doing so, an engine driving power changes smoothly when the motorcycle 1 is accelerated after the fuel injection is resumed, which improves driving feel.

Then, the main controller 31 determines whether or not the driver has input the acceleration command (step S11). To be specific, the main controller 31 determines whether or not the throttle grip opening degree $\phi$ is larger than zero. If Yes in step S11 (time $t_4$ in FIG. 4), the process returns to the normal operation (step S1) to perform an engine driving power increasing step. In this engine driving power increasing preparation step, the throttle valve opening degree $\theta$ increases according to an increase in the throttle grip opening degree $\phi$, thereby increasing the engine driving power.

The delay time T decided in step S8 is determined according to the driving state of the motorcycle 1. To be specific, the main controller 31 in the engine ECU 19 contains a delay time map indicative of a correlation between the value detected by a driving state detecting sensor and the delay time T. The driving state detecting sensor includes at least one of the brake pressure sensors 41 and 42, the engine speed sensor 28, the front wheel speed sensor 37 and the gear position sensor 29.

The delay time map is set such that the delay time T is shorter as the brake pressure (braking amount) detected by the brake pressure sensor 41 or 42 or a braking pressure change rate per unit time from when the braking starts is larger (sudden braking occurs). The delay time map is set such that the delay time T is shorter as the engine speed detected by the engine speed sensor 28 or an engine speed change rate per unit time after the braking starts is larger. The delay time map is set such that the delay time T is shorter as the front wheel speed (i.e., driving speed) detected by the front wheel speed sensor 37 is higher.

When the braking amount, the braking amount change rate, the engine speed, the engine speed change rate, the driving speed or the driving speed change rate is large, the driving speed decreases significantly due to deceleration. Therefore, more often than not, after that, it is desirable for the engine E to be accelerated quickly. When the engine speed or the driving speed is higher, a total amount of the intake-air guided to the engine E during the fuel stop control increases, and therefore a degree to which an inner wall of the air-intake passage is dried increases. Accordingly, the delay time T is set shorter when at least one of the braking amount, the braking amount change rate, the engine speed, the engine speed change rate, the driving speed and the driving speed change rate, is larger. This increases a time that lapses from when the fuel injection is resumed (engine driving power increasing preparation starts) until the acceleration command is input, and allows a sufficient fuel to adhere onto an inner wall of the pipe of the air-intake passage of the throttle device 22. As a result, the fuel in the air-fuel mixture can be made rich when the acceleration command is input after the engine driving power increasing preparation, thereby obtaining smooth acceleration with a fluctuation in the engine driving power lessened.

The delay time map may be set such that the delay time T is longer when the gear position detected by the gear position sensor 29 is 1st gear with a highest reduction gear ratio than when the gear position is another gear position (2nd gear-6th gear). A high torque is generated when the gear position set in the transmission 18 is 1st gear with a highest reduction gear ratio. The delay time T is set longer for 1st gear with a highest reduction gear ratio than for other gear positions so that a time that lapses from when the fuel injection is resumed (engine driving power increasing preparation starts) until the acceleration command is input is shorter. This prevents a large amount of the fuel from adhering onto the inner wall of the pipe of the air-intake passage of the throttle device 22. Thus, it is possible to suppress a torque from increasing excessively when acceleration re-starts. As a result, a stable acceleration is achieved.

Alternatively, the delay time map may be set such that the delay time T is shorter when the gear position detected by the gear position sensor 29 is 1st gear with a highest reduction gear ratio than when the gear position is another gear position (2nd gear-6th gear). More often than not, a sufficient accelerative power is necessary when the gear position is 1st gear with a highest reduction gear ratio. Accordingly, by setting the delay time T shorter for 1st gear than for other gear positions, the time that lapses from when the fuel injection is resumed (driving power increasing preparation starts) until the acceleration command is input increases, and the fuel adhering onto the inner wall of the pipe of the air-intake passage of the throttle device 22 increases. As a result, a torque sufficiently increases when acceleration re-starts and an acceleration capability can be improved. Although the delay time T is made different between 1st gear and other gear positions, it may be made different between a group (e.g., 1st gear, 2nd gear) with a higher reduction gear ratio and a group (e.g., 3rd gear or higher) with a lower reduction gear ratio.

The delay time T may be set to a time shorter than a time (this time can be obtained from an experiment) from a time point when it is determined that inputting of the braking command stops until the acceleration command is input, and may be set to, for example, a value which is not less than 0 seconds and not more than 0.5 seconds. The delay time T may be set by the driver's operation of the operation panel 35. Although in this embodiment, the delay time T is set variable according to the driving state or the engine running state, it may be constant regardless of the driving state or the engine running state. In a further alternative, the delay time T may be set longer in a low fuel consumption mode than in a non-low-fuel-consumption mode. Moreover, the delay time T may be set to zero.

In accordance with the configuration as described above, the fuel injection to the engine E is resumed when it is determined that inputting of the braking command stops during the fuel stop control. Therefore, the fuel is allowed to adhere onto the dried inner wall of the pipe of the air-intake passage and a fluctuation in the engine driving power which would be caused by a fluctuation in the air-fuel ratio can be suppressed. Thus, the fuel stop control is executed and the engine driving power can be suppressed. As a result, fuel efficiency and drivability are improved.

Embodiment 2

Figure 5:
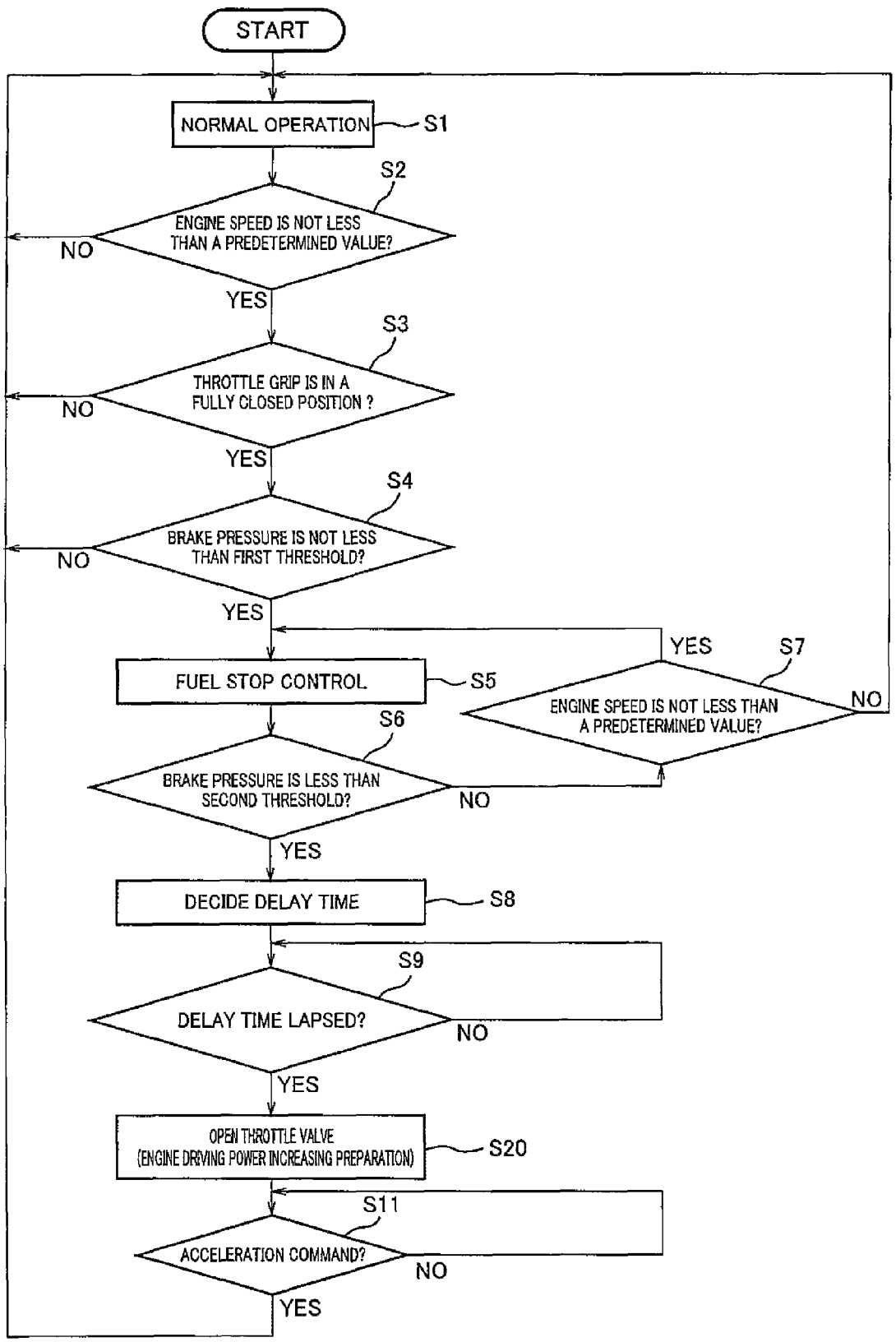
FIG. 5 is a flowchart showing a control process in a motorcycle according to Embodiment 2 of the present invention.
Figure 6:
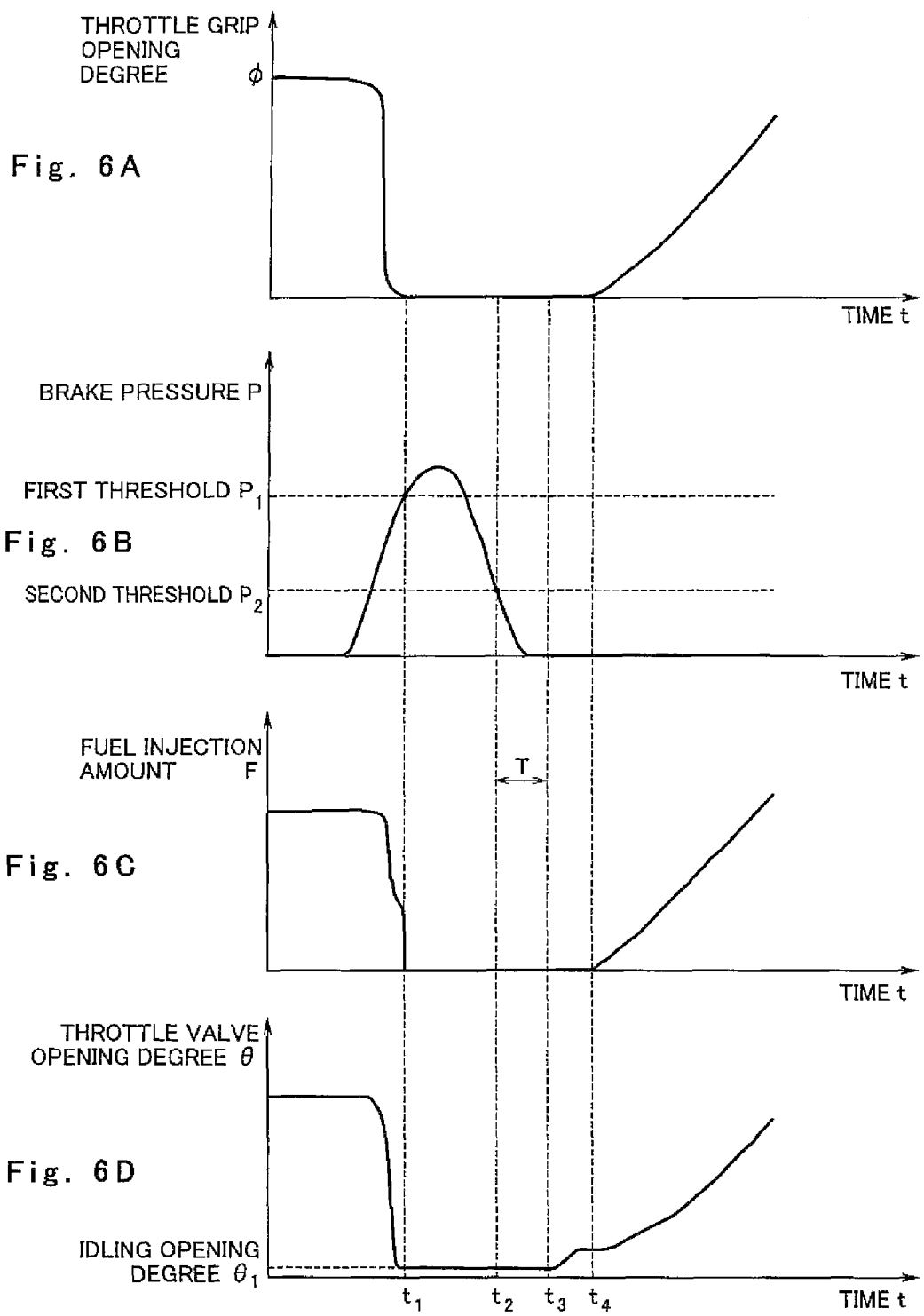
FIG. 6 is a graph showing the control process in FIG. 5.

FIG. 5 is a flowchart showing a control process in the motorcycle 1 according to Embodiment 2 of the present invention. FIG. 6 is a graph showing the control process in FIG. 5. Hereinafter, the control process executed from when the engine E is transitioning from the fuel stop control state to the accelerated state will be described with reference to FIGS. 2, 5, and 6. Step S1-step S9 are identical to those of Embodiment 1 and will not be described repetitively. If it is determined that the delay time T lapsed from the time point when it is determined that inputting of the braking command stops, i.e., the braking command is not input any more (time $t_3$ in FIG. 6), the throttle valve opening degree θ is slightly increased to a certain degree without resuming the fuel injection by the injector 26 (step S20). When the throttle valve opening degree θ is slightly increased, the timing when the throttle valve opening degree θ starts to be increased may be made different between the four cylinders of the engine E.

Then, the main controller 31 determines whether or not the driver has input the acceleration command (step S11). To be specific, the main controller 31 determines whether or not the throttle grip opening degree ϕ is larger than zero. If Yes in step S11 (time $t_4$ in FIG. 6), the process returns to the normal operation (step S1) to perform the driving power increasing step. Thereby, the injector 26 resumes fuel injection, and the throttle valve opening degree θ increases according to an increase in the throttle grip opening degree ϕ, thereby increasing the engine driving power.

In accordance with the above described configuration, since the throttle valve opening degree θ is increased if it is determined that inputting of the braking command stops during the fuel stop control, an air-intake amount is increased before the driver performs an operation for accelerating the motorcycle 1, and an engine driving power increases with a high responsiveness to the driver's operation for accelerating the motorcycle 1. This prevents the engine driving power from suddenly increasing at a time point retarded with respect to a time point when the driver starts the operation for accelerating the motorcycle 1. As a result, a fluctuation in the engine driving power can be suppressed when the engine E is transitioning from the decelerated state to the accelerated state, and drivability can be improved. The other constituents are identical to those of Embodiment 1 and will not be described repetitively.

Embodiment 3

Figure 7:
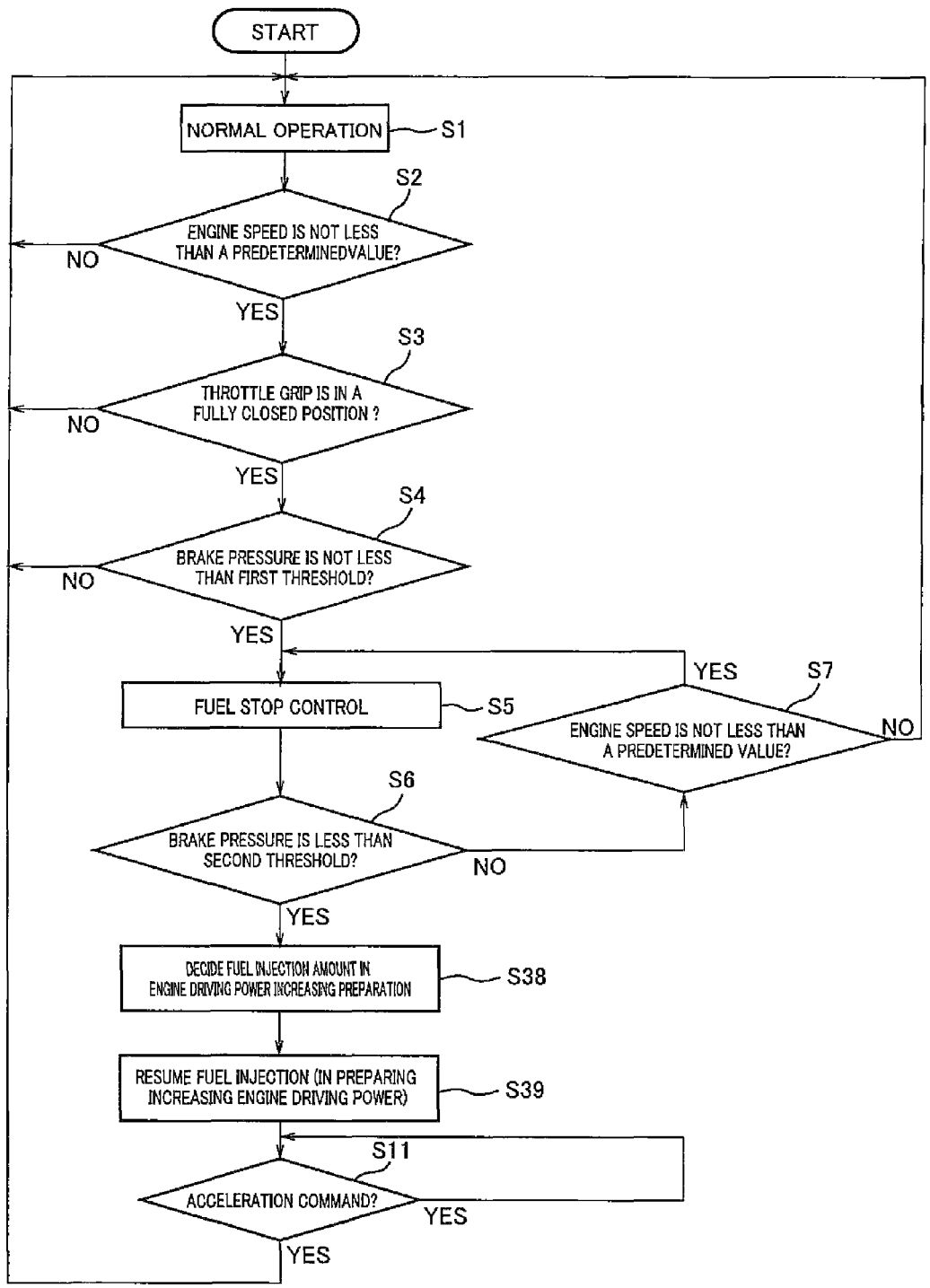
FIG. 7 is a flowchart showing a control process in a motorcycle according to Embodiment 3 of the present invention.
Figure 8:
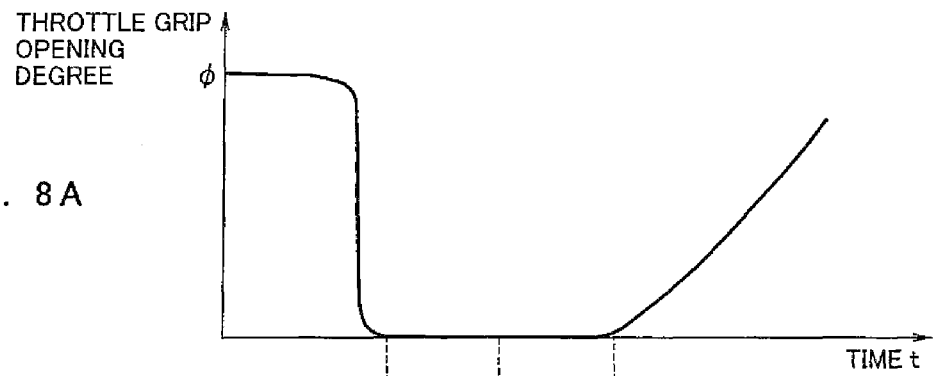
FIG. 8 is a graph showing the control process in FIG. 7.
Figure 8:
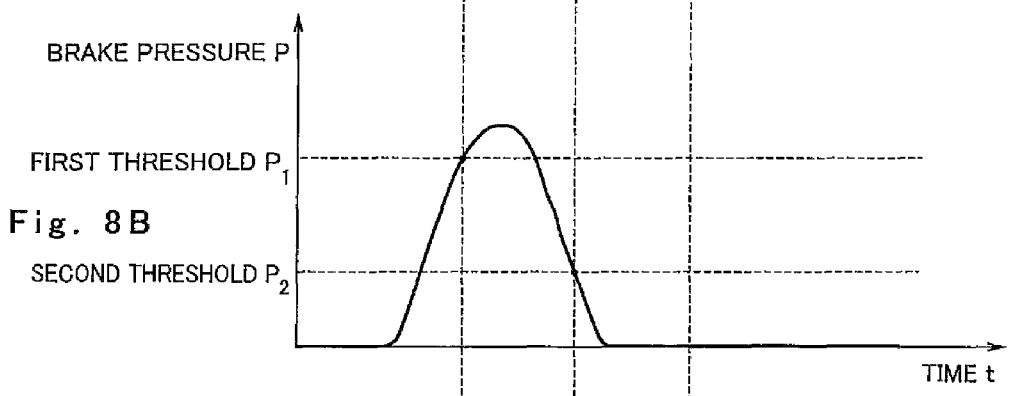
Figure 8:
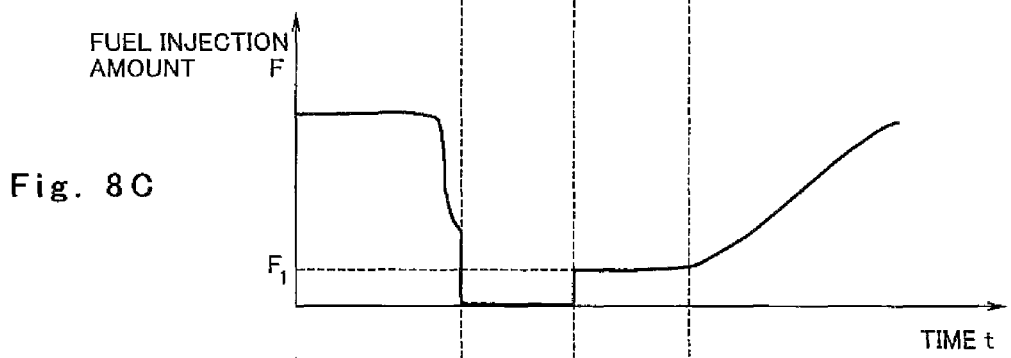
Figure 8:
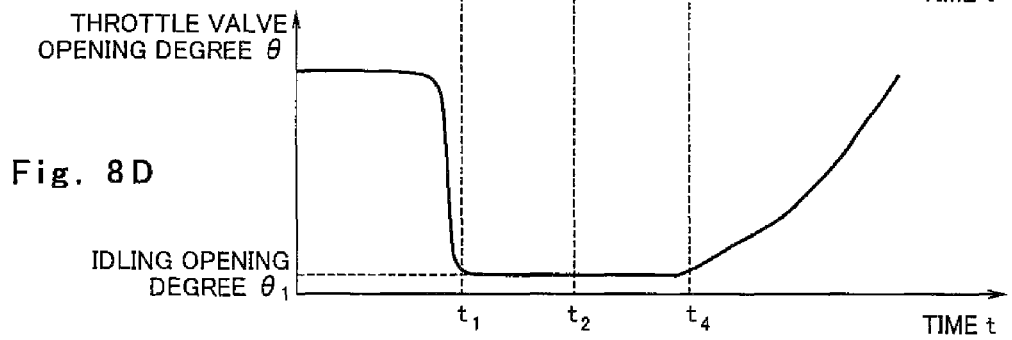

FIG. 7 is a flowchart showing a control process in the motorcycle 1 according to Embodiment 3 of the present invention. FIG. 8 is a graph showing the control process in FIG. 7. Hereinafter, the control process executed when the engine E is transitioning from the fuel stop control state to the accelerated state will be described with reference to FIGS. 2, 7, and 8. Step S1-step S7 are identical to those of Embodiment 1 and will not be described repetitively. If it is determined that the brake pressure is less than the second threshold $P_2$ in step S6 (time $t_2$ in FIG. 8), the main controller 31 decides the fuel injection amount $F_1$ in engine driving power increasing preparation (step S38).

The fuel injection amount $F_1$ in driving power increasing preparation is determined according to the driving state of the motorcycle 1. To be specific, the main controller 31 in the engine ECU 119 contains a driving power increasing preparation fuel injection amount map indicating a correlation between the value detected by the driving state detecting sensor and the fuel injection amount $F_1$. The driving state detecting sensor includes, for example, at least one of the brake pressure sensors 41 and 42, the engine speed sensor 28, the front wheel speed sensor 37 and the gear position sensor 29.

The driving power increasing preparation fuel injection amount map is set such that the fuel injection amount $F_1$ is more as the brake pressure detected by the brake pressure sensor 41 or 42 or the brake pressure change rate is larger. The driving power increasing preparation fuel injection amount map is set such that the fuel injection amount $F_1$ is more as the engine speed detected by the engine speed sensor 28 is higher. The driving power increasing preparation fuel injection amount map is set such that the fuel injection amount $F_1$ is more as the front wheel speed (i.e., driving speed) detected by the front wheel speed sensor 37 is higher.

When the braking amount, the braking amount change rate, the engine speed, the engine speed change rate, the driving speed or the driving speed change rate is large, the driving speed decreases significantly due to deceleration. More often than not, after that, it is desired that the engine E be accelerated quickly. When the engine speed, the driving speed, or their change rates is/are higher, a total amount of an intake-air guided to the engine E increases during the fuel stop control, and a degree to which the inner wall of the air-intake passage is dried increases. Accordingly, by setting the fuel injection amount $F_1$ in the engine driving power increasing preparation larger when at least one of the braking amount, the engine speed, the driving speed, and their change rates is/are large, a sufficient fuel is allowed to adhere onto the inner wall of the pipe of the air-intake passage of the throttle device 22. As a result, the fuel in the air-fuel mixture can be made rich when the acceleration command is input after the engine driving power increasing preparation. Thus, smooth acceleration is attained while lessening a fluctuation in the engine driving power.

The driving power increasing preparation fuel injection amount map is set such that the fuel injection amount $F_1$ is less when the gear position detected by the gear position sensor 29 is 1st gear with a highest reduction gear ratio than when the gear position is another gear position (2nd gear-6th gear). A high torque is generated when the gear position detected by the gear position sensor 29 is 1st gear with a highest reduction gear ratio. Therefore, the fuel injection amount $F_1$ is set less for 1st gear with a highest reduction gear ratio than for other gear positions to prevent a large amount of the fuel from adhering onto the inner wall of the pipe of the air-intake passage of the throttle device 22. Thus, it is possible to suppress a torque from increasing excessively when acceleration re-starts. As a result, a stable acceleration is achieved.

Alternatively, the driving power increasing preparation fuel injection amount map may be set such that the fuel injection amount $F_1$ is more when the gear position detected by the gear position sensor 29 is 1st gear with a highest reduction gear ratio than when the gear position is another gear position (2nd gear-6th gear). More often than not, a sufficient accelerative power is necessary when the gear position detected by the gear position sensor 29 is 1st gear with a highest reduction gear ratio than when the gear position is another gear position. Accordingly, by setting the fuel injection amount $F_1$ more for 1st gear than for other gear positions, the fuel adhering onto the inner wall of the pipe of the air-intake passage of the throttle device 22 increases. As a result, an acceleration capability can be improved when acceleration re-starts.

Although the fuel injection amount $F_1$ is made different between 1st gear and other gear positions, it may be made different between a group (e.g., 1st gear, 2nd gear) with a higher reduction gear ratio and a group (e.g., 3rd gear or higher) with a lower reduction gear ratio. The fuel injection amount $F_1$ may be set by the driver's operation of the operation panel 35. Although in this embodiment, the fuel injection amount $F_1$ is set variable according to the driving state or the engine running state, it may be constant regardless of the driving state or the engine running state. Moreover, the fuel injection amount $F_1$ may be set lower in the low fuel consumption mode.

If Yes in step S6 (time $t_3$ in FIG. 8), the injector 26 resumes fuel injection with the fuel injection amount $F_1$ decided in step S38 with the throttle valve opening degree θ maintained at the idling opening degree $θ_1$ in the engine driving power increasing preparation step (step S39). When the fuel injection is resumed, the timing when the fuel injection is resumed may be made different between the four cylinders of the engine E.

Then, the main controller 31 determines whether or not the driver has input an acceleration command (step S11). To be specific, the main controller 31 determines whether or not the throttle grip opening degree φ is larger than zero. If Yes in step S11 (time $t_4$ in FIG. 8), the process returns to the normal operation (step S1) to perform the engine driving power increasing step. The injector 26 normally performs the fuel injection with reference to a normal fuel injection map. The throttle valve opening degree θ increases according to an increase in the throttle grip opening degree φ, thereby increasing the engine driving power.

In accordance with the above configuration, the fuel injection amount $F_1$ in the engine driving power increase preparation is controlled according to the driving state during the fuel stop control to allow the motorcycle 1 to be re-accelerated according to the driving state at that point in time. The other constituents are identical to those of Embodiment 1 and will not be described repetitively. In Embodiment 3, like Embodiment 1, the delay time T may be variable according to the driving state or the engine running state, in addition to the fuel injection amount $F_1$. Since the fuel injection amount and the delay time are variable, a control according to various states can be implemented.

Embodiment 4

Figure 9:
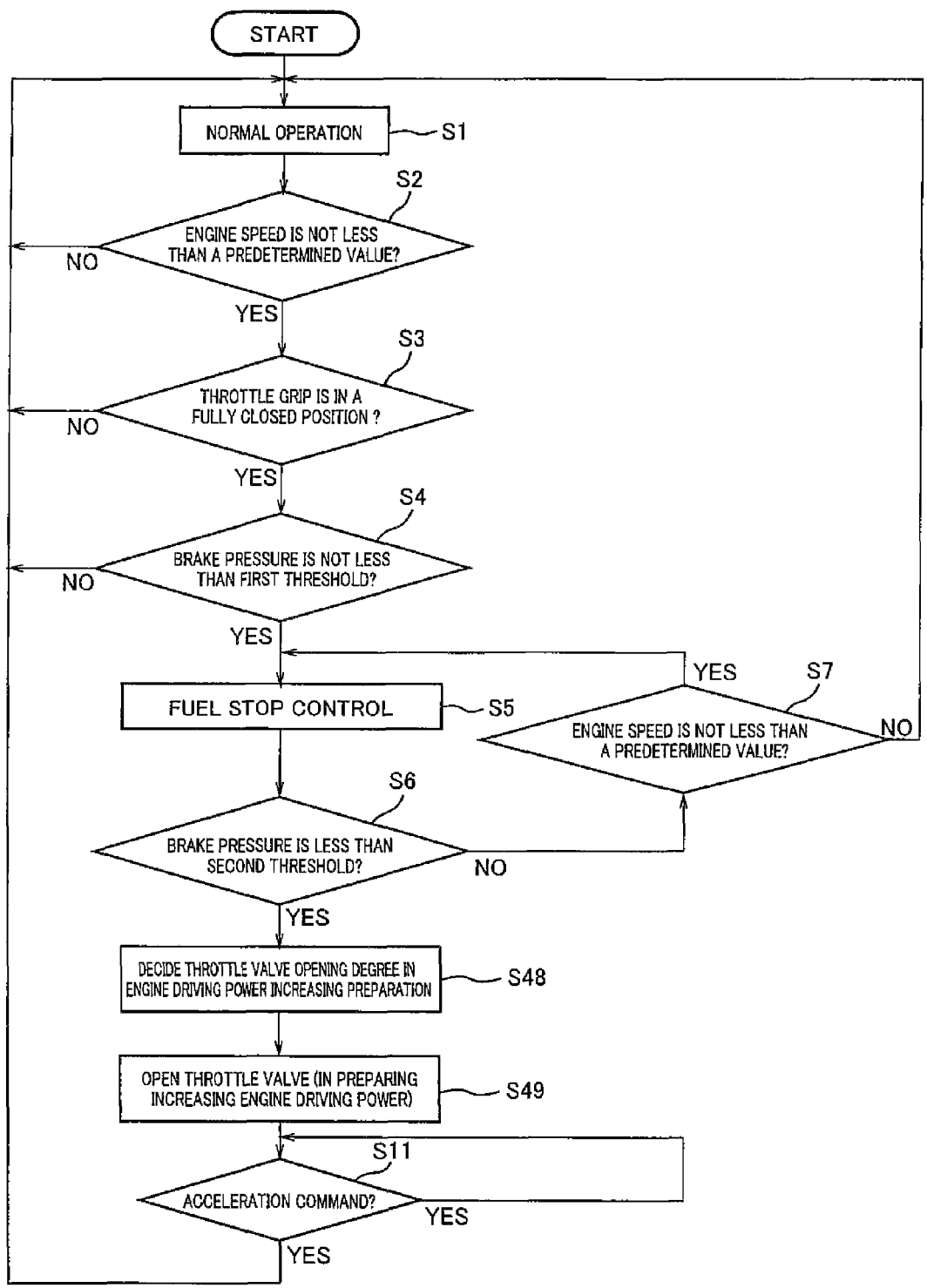
FIG. 9 is a flowchart showing a control process in a motorcycle according to Embodiment 4 of the present invention.
Figure 10:
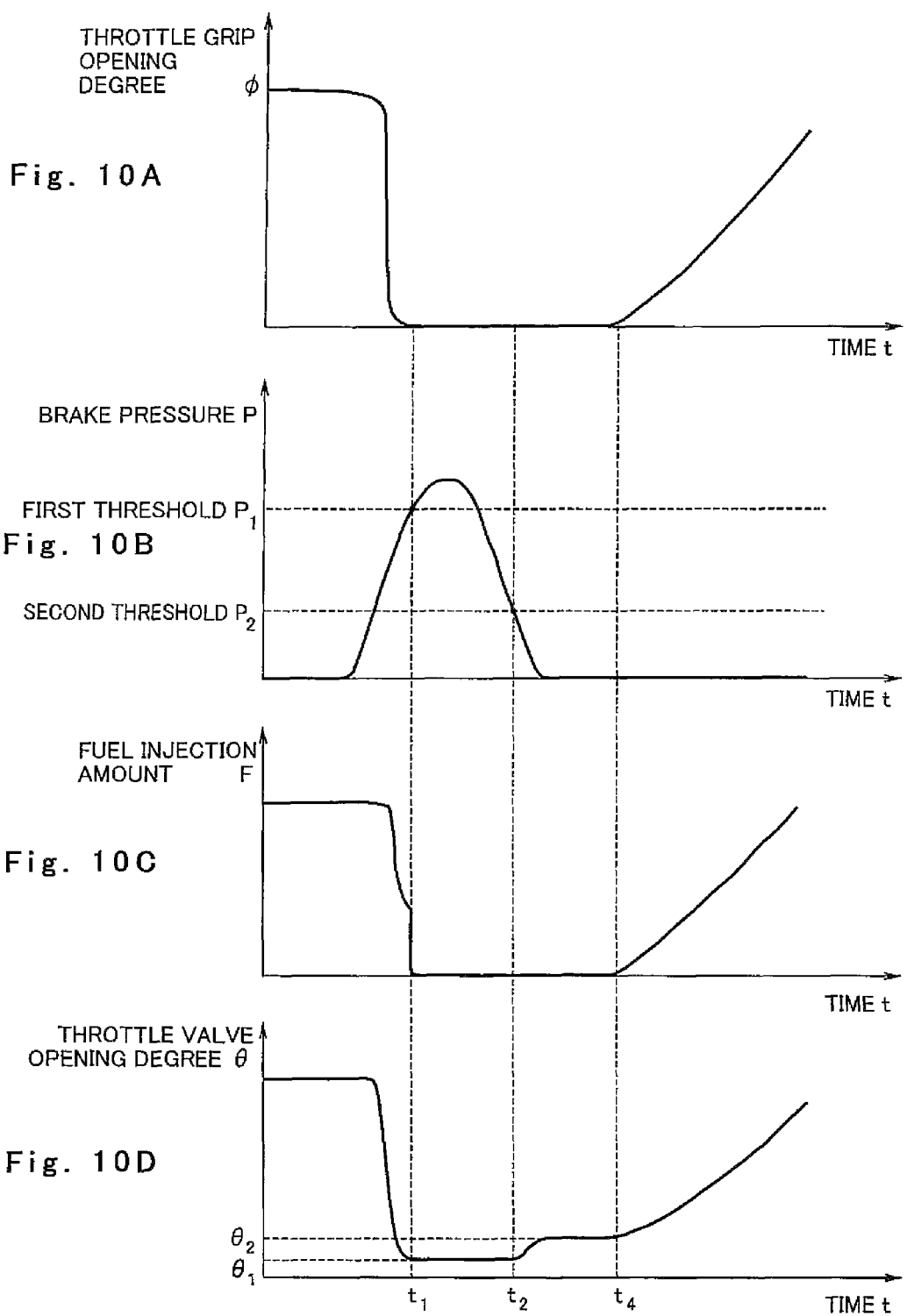
FIG. 10 is a graph showing the control process in FIG. 9.

FIG. 9 is a flowchart showing a control process in the motorcycle 1 according to Embodiment 4 of the present invention. FIG. 10 is a graph showing the control process in FIG. 9. Hereinafter, the control process executed from when the engine E is transitioning from the fuel stop control state to the accelerated state will be described with reference to FIGS. 2, 9, and 10. Step S1-step S7 are identical to those of Embodiment 1 and will not be described repetitively. If it is determined that the brake pressure P is less than the second threshold $P_2$ in step S6 (time $t_2$ in FIG. 10), the main controller 31 decides a throttle valve opening degree $θ_2$ in the engine driving power increasing preparation (step S48).

The throttle valve opening degree $θ_2$ in the engine driving power increasing preparation is determined according to the driving state of the motorcycle 1. To be specific, the main controller 31 in the engine ECU 119 contains a driving power increasing preparation throttle valve opening degree map indicating a correlation between the value detected by the driving state detecting sensor and the throttle valve opening degree $θ_2$. The driving state detecting sensor includes, for example, at least one of the brake pressure sensor 41 or 42, the engine speed sensor 28, the front wheel speed sensor 37 and the gear position sensor 29.

The driving power increasing preparation throttle valve opening degree map is set such that the throttle valve opening degree $θ_2$ is larger as the brake pressure detected by the engine speed sensor 41 or 42 or the brake pressure change rate is higher. The driving power increasing preparation throttle valve opening degree map is set such that the throttle valve opening degree $θ_2$ is larger as the engine speed detected by the engine speed sensor 28 is higher. The driving power increasing preparation throttle valve opening degree map is set such that the throttle valve opening $θ_2$ is larger as the front wheel speed (i.e., driving speed) detected by the front wheel speed sensor 37 is higher.

When the braking amount, the braking amount change rate, the engine speed, or the driving speed is large, the driving speed decreases significantly due to deceleration. More often than not, after that, it is desirable for the engine E to be accelerated quickly. Accordingly, the throttle valve opening degree $θ_2$ in the engine driving power increasing preparation is set larger when at least one of the braking amount, the braking amount change rate, the engine speed, and the driving speed is larger. This makes it possible to ensure an air-intake amount which allows combustion to easily occur in cylinders. Therefore, the engine driving power increases with a high responsiveness in response to the driver's operation for accelerating the motorcycle 1, and smooth acceleration is achieved.

The driving power increasing preparation throttle valve opening degree map may be set such that the throttle valve opening degree $\theta_2$ is smaller when the gear position detected by the gear position sensor 29 is 1st gear with a highest reduction gear ratio than when the gear position is another gear position (2nd gear-6th gear). A high torque is generated when the gear position is 1st gear with a highest reduction gear ratio. Therefore, the throttle valve opening degree $\theta_2$ is set smaller for 1st gear with a highest reduction gear ratio than for other gear positions to prevent a torque from becoming too high. As a result, a stable acceleration is achieved.

Alternatively, the driving power increasing preparation throttle valve opening degree map may be set such that the throttle valve opening degree $\theta_2$ is larger when the gear position detected by the gear position sensor 29 is 1st gear with a highest reduction gear ratio than when the gear position is another gear position (2nd gear-6th gear). More often than not, a sufficient accelerative power is necessary when the gear position detected by the gear position sensor 29 is 1st gear with a highest reduction gear ratio. Accordingly, by setting the throttle valve opening degree $\theta_2$ larger for 1st gear than for other gear positions, a torque is made sufficiently high when acceleration re-starts, and an acceleration capability can be improved.

The throttle valve opening degree $\theta_2$ may be set by the driver's operation of the operation panel 35. Although in this embodiment, the throttle valve opening degree $\theta_2$ is set variable, it may be constant. Moreover, the driving power increasing preparation throttle valve opening degree map may be set such that the throttle valve opening degree $\theta_2$ may be set smaller in the low fuel consumption mode.

If Yes in step S6 (time t3 in FIG. 10), the throttle valve opening degree $\theta$ is increased up to the throttle valve opening degree $\theta_2$ decided in step S48 without resuming the fuel injection by the injector 26, as the engine driving power increasing preparation step (step S49). In this case, the timing when the throttle valve opening degree $\theta$ is increased may be made different between the four cylinders of the engine E.

Then, the main controller 31 determines whether or not the driver has input an acceleration command (step S11). To be specific, the main controller 31 determines whether or not the throttle grip opening degree $\phi$ is larger than zero. If Yes in step S11 (time $t_4$ in FIG. 10), the process returns to the normal operation (step S1) to perform the engine driving power increasing step. The injector 26 resumes fuel injection. The throttle valve opening degree $\theta$ increases according to an increase in the throttle grip opening degree $\phi$, thereby increasing the engine driving power.

In accordance with the above mentioned configuration, since the throttle valve opening degree $\theta_2$ in the engine driving power increasing preparation is controlled according to the driving state during the fuel stop control, the engine driving power increasing preparation can be executed to allow the motorcycle 1 to be re-accelerated according to the driving state at that point in time. The other constituents in Embodiment 4 are identical to those of Embodiment 1 and will not be described repetitively. In Embodiment 4, like Embodiment 1, the delay time may be variable according to the driving state or the engine running state, in addition to the throttle valve opening degree. If the throttle valve opening degree and the delay time are variable, a control according to various states can be implemented. Moreover, like Embodiment 3, the fuel injection amount may be set variable according to the states, in addition to the throttle valve opening degree.

Embodiment 5

Figure 11:
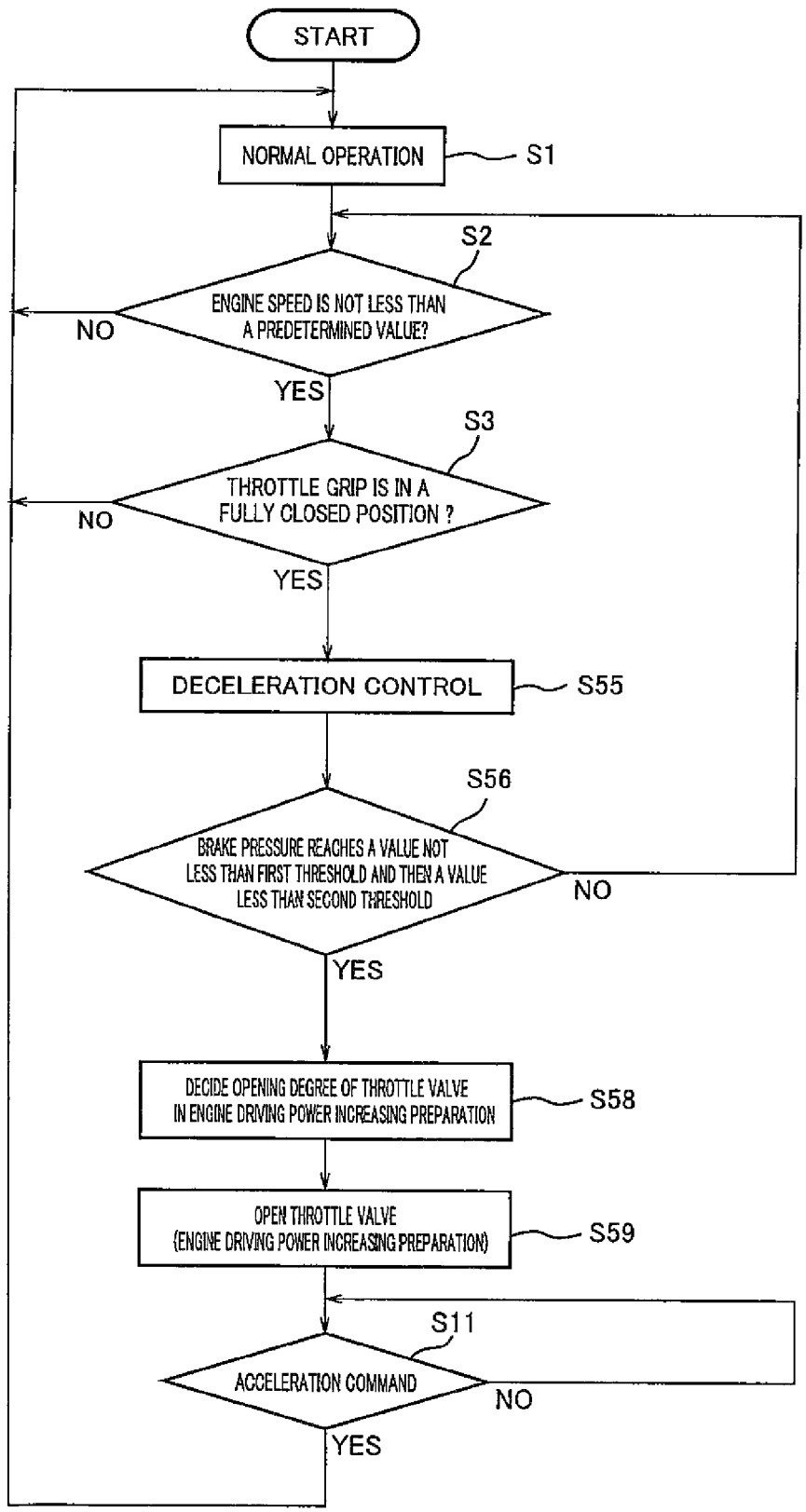
FIG. 11 is a flowchart showing a control process in a motorcycle according to Embodiment 5 of the present invention.

FIG. 11 is a flowchart showing a control process in the motorcycle 1 according to Embodiment 5 of the present invention. Hereinafter, the control process executed from when the engine E is transitioning from a decelerated state to an accelerated state will be described with reference to FIGS. 2 and 11. That is, this embodiment relates to a control executed when the motorcycle 1 is re-accelerated in a normal decelerated state.

Upon the engine E starting to run, the normal operation starts (step S1). During the normal operation, the main controller 31 in the ECU 19 determines whether or not predetermined deceleration conditions are met (step S2, step S3). To be specific, the main controller 31 determines whether or not the engine speed detected by the engine speed sensor 28 is not less than a predetermined value (step S2). If Yes in step S2, the throttle grip opening degree $\phi$ detected by the grip position sensor 30 is in the fully closed position (zero or a value closer to zero) (the throttle grip 8 is in a position corresponding to the fully closed position of the throttle valve 23) (step S3). If Yes in step S3, it is determined that the deceleration condition is met, and a deceleration control is executed as a step of decelerating the motorcycle 1 (step S55). The deceleration control is a normal control for decreasing the opening degree of the throttle valve 23 to the idling opening degree and the injector 26 decreases the fuel injection amount to the air-intake passage to an amount corresponding to an idling air-intake amount corresponding to the idling opening degree, thereby decreasing the engine driving power.

During the deceleration control, the main controller 31 determines whether or not the brake pressure P detected by the front wheel brake pressure sensor 41 or the rear wheel brake pressure sensor 42 reaches a value which is not less than the first threshold $P_1$ and then reaches a value which is less than the second threshold $P_2$ (step S56). If No in step S56, the process returns to step S2. On the other hand, if Yes in step S56, it is determined that inputting of the braking command stops, and the main controller 31 decides the opening degree of the throttle valve 23 in the engine driving power preparation (step S58). In the engine driving power increasing preparation step, the throttle valve opening degree $\theta$ is increased to the throttle opening degree (opening degree slightly larger than the idling opening degree) decided in step S58 without resuming fuel injection by the fuel injector 26 (step S59). In this case, the timing when the throttle valve opening degree $\theta$ is increased may be made different between the four cylinders of the engine E.

Then, the main controller 31 determines whether or not the driver has input an acceleration command (step S11). To be specific, the main controller 31 determines whether or not the throttle grip opening degree $\phi$ is larger than zero. If Yes in step S11 (time $t_4$ in FIG. 11), the process returns to the normal operation (step S1) to perform the engine driving power increasing step. The injector 26 resumes fuel injection. The throttle valve opening degree $\theta$ increases according to an increase in the throttle grip opening degree $\phi$, thereby increasing the engine driving power.

In accordance with the above configuration, the throttle valve opening degree is increased when it is determined that the inputting of the braking command stops during the normal deceleration control. Therefore, the air-intake amount is increased before the driver performs the operation for accelerating the motorcycle 1, and as a result, the engine driving power increases with a high responsiveness in response to the driver's operation for accelerating the motorcycle 1. This prevents the engine driving power from suddenly increasing at a time point retarded with respect to a time point when the driver starts the operation for accelerating the motorcycle 1. As a result, a fluctuation in the engine driving power can be suppressed when the engine E is transitioning from the decelerated state to the accelerated state, and a drivability can be improved.

In the control executed when the motorcycle 1 is re-accelerated in a normal decelerated state in this embodiment, the delay time T may be set or the throttle valve opening degree in the engine driving power increasing preparation may be set variable according to the driving state. Although in this embodiment, it is determined that inputting of the braking command stops using the brake pressure sensor, it may be determined using another device. For example, it may be determined that inputting of the braking command stops using a sensor for detecting a displacement position of a brake lever. Or, it may be determined that inputting of the braking command stops based on an event that a deceleration change in a vehicle speed per unit time reaches substantially zero, or an event that the deceleration change is gentle. It may be determined that inputting of the braking command stops using one of the first and second thresholds, instead of using the first and second thresholds. In that case, it may be determined that the braking command reaches a value which is more than a predetermined value and then reaches a value which is less than this predetermined value.

Embodiment 6

Figure 12:
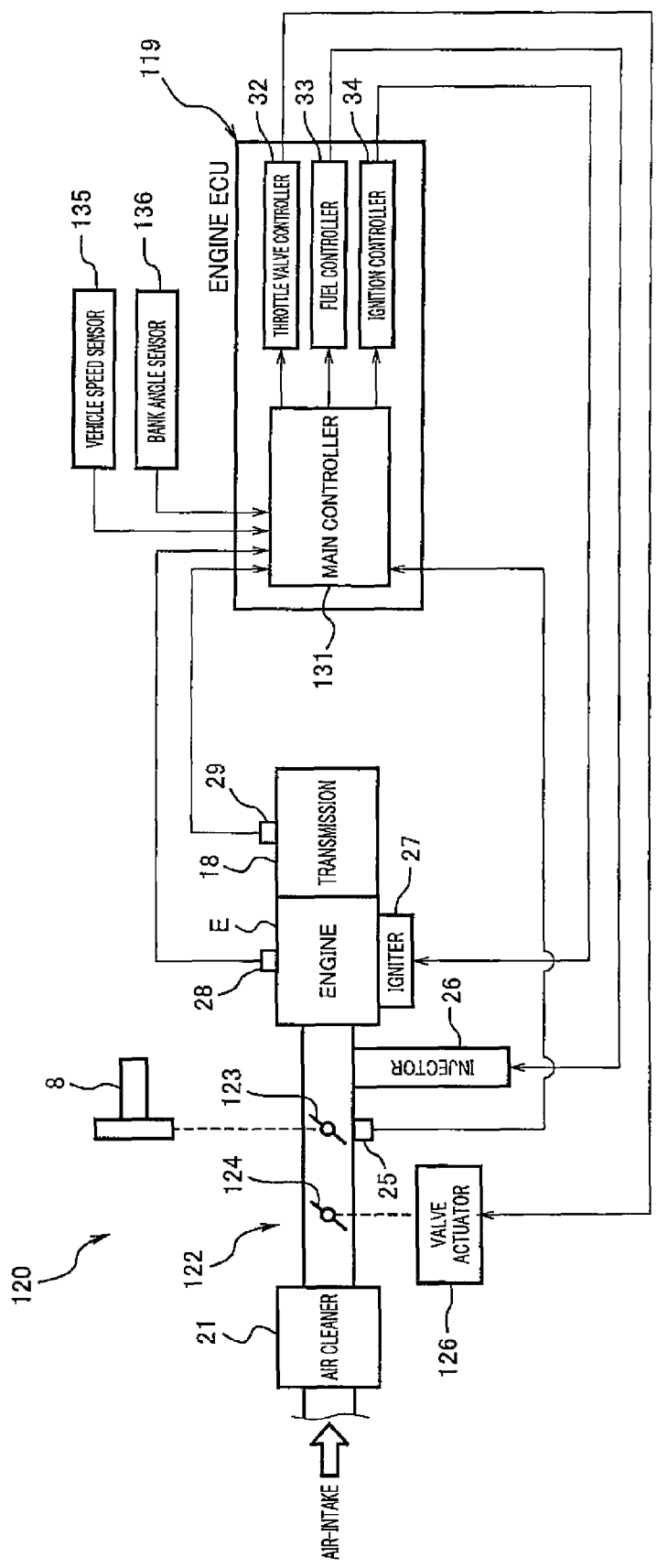
FIG. 12 is a block diagram showing a control system in a motorcycle according to Embodiment 6 of the present invention.
Figure 13:
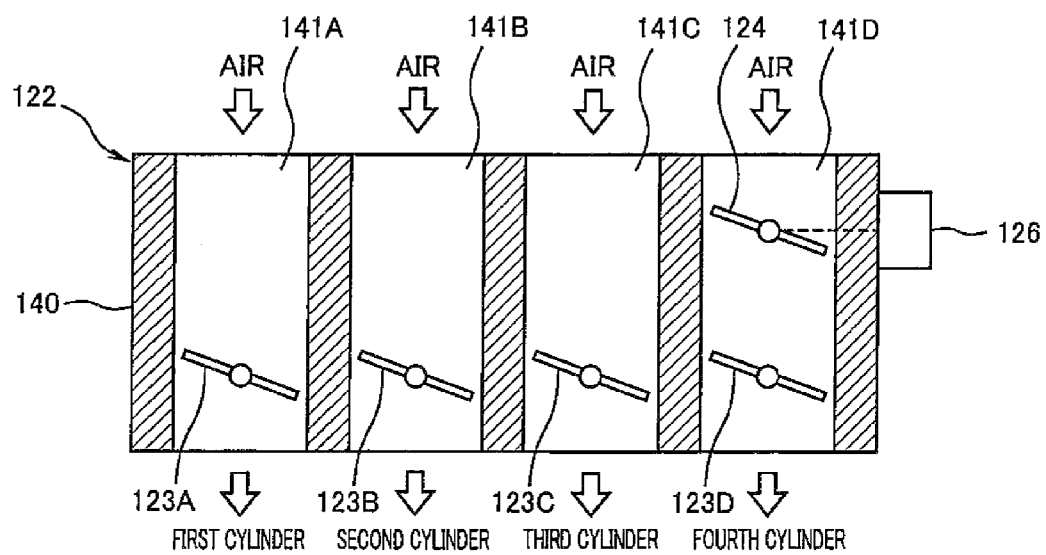
FIG. 13 is a schematic cross-sectional view of a throttle device of the motorcycle in FIG. 12.

FIG. 12 is a flowchart showing a control system 120 in a motorcycle 1 according to Embodiment 6 of the present invention. FIG. 13 is a schematic cross-sectional view of a throttle device 122 of the motorcycle 1 in FIG. 12. Referring to FIG. 12, the air cleaner 21 is coupled to air-intake ports (not shown) of the engine E via the throttle device 122. The throttle device 122 includes main throttle valves 123 provided to respectively correspond to the four cylinders in the engine E and are mechanically operative according to the driver's operation of the throttle grip 8 and a sub-throttle valve 124 provided to correspond to only one of the cylinders. The main throttle valve 123 is attached with the throttle valve position sensor 25 for detecting the opening degree of the main throttle valve 123. Since the main throttle valve 123 is mechanically operative according to the operation of the throttle grip 8, the throttle valve position sensor 25 serves as an acceleration command value detector capable of detecting the opening degree (acceleration command) of the throttle grip 8.

Referring to FIG. 13, the throttle device 122 includes a throttle body 140 having four independent air-intake passages, i.e., first to fourth air-intake passages 141A-141D. Each of the first to fourth air-intake passages 141A-141D are individually coupled to the first to fourth cylinders in the engine E, respectively. First to fourth main throttle valves 123A-123D are disposed in the first to fourth air-intake passages 141A-141D, respectively to control the air-intake amount. The first to fourth main throttle valves 123A-123D are mechanically coupled to the throttle grip 8 (see FIG. 12) via cables and the like. Note that the sub-throttle valve 124 is provided in the fourth air-intake passage 141D such that the sub-throttle valve 124 is positioned upstream of the main throttle valve 123D. The air-intake passage depicted in FIG. 12 is the fourth air-intake passage 141D. The sub-throttle valve 124 is coupled to a valve actuator 126 constituted by a motor and is electronically controlled by the engine ECU 119. The sub-throttle valve 124 is configured to be opened and closed by the valve actuator 126 electronically controlled by the engine ECU 119. No sub-throttle valve is provided in the first to third air-intake passages 141A-141C.

Turning back to FIG. 12, the throttle device 122 is provided with injectors 26 which are fuel feeders each of which individually feeds fuel to the first to fourth air-intake passages 141A-141D (see FIG. 13), respectively. The engine E is provided with igniters 27 for igniting the air-fuel mixture in the first to fourth cylinders.

The engine ECU 119 is coupled to the throttle valve position sensor 25, a crank angle sensor 28, the gear position sensor 29, a vehicle speed sensor 135 and a bank angle sensor 136. The vehicle speed sensor 135 is configured to detect a rotation number of the front wheel 2 (see FIG. 1) to detect a driving speed of the motorcycle 1. The bank angle sensor 136 is configured to detect an angle to which a vehicle body of the motorcycle 1 is banked laterally with respect to a normal upright position. To be specific, the bank angle detected by the bank angle sensor 136 is zero when the vehicle body of the motorcycle 1 is in the normal upright position and is a positive value when the motorcycle 1 is banked to the right or to the left.

The engine ECU 119 includes a main controller 131, the throttle valve controller 32, the fuel controller 33 and the ignition controller 34. The main controller 131 is configured to perform calculation and the like relating to engine control based on the signals received from the sensors 25, 28, 29, 135 and 136. Based on data of the calculation made by the main controller 131, the throttle valve controller 32 controls the valve actuator 126 to control the opening degree of the sub-throttle valve 124 provided in the fourth air-intake passage 141D (see FIG. 13). Based on data of the calculation made by the main controller 131, the fuel controller 33 controls the injector 26. Based on data of the calculation made by the main controller 131, the ignition controller 34 controls the igniter 27.

Figure 14:
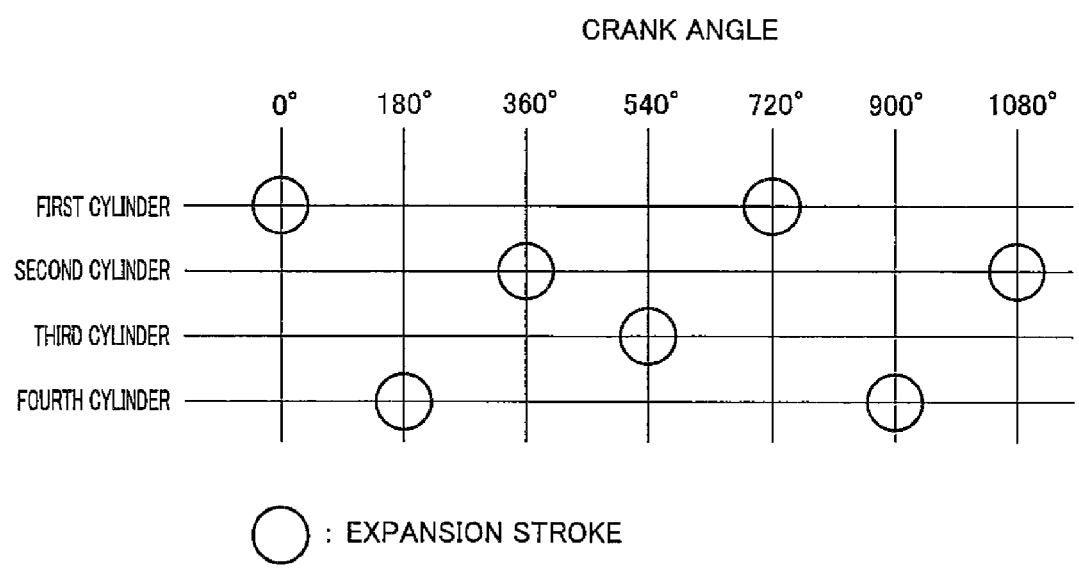
FIG. 14 is a view showing timings when expansion strokes occur in an engine of the motorcycle in FIG. 12.

FIG. 14 is a view showing timings when expansion strokes occur in the engine E of the motorcycle 1 in FIG. 12. Referring to FIG. 14, in the engine E, the timings when expansion strokes occur in the first to fourth cylinders are set at equal intervals (180 degrees) with respect to a crank angle. Assuming that a driving power in the expansion stroke of the fourth cylinder is suppressed as compared to those of the expansion strokes of the first to third cylinders, the driving powers generated in the expansion strokes of the first to third cylinders substantially form an engine driving power. In that case, the timings when expansion strokes occur in the first to third cylinders are set at unequal intervals (360 degrees, 180 degrees) with respect to the crank angle. Since the fourth cylinder is placed in a driving power suppressed state, a characteristic of an engine configured to perform expansion at unequal intervals results.

Figure 15:
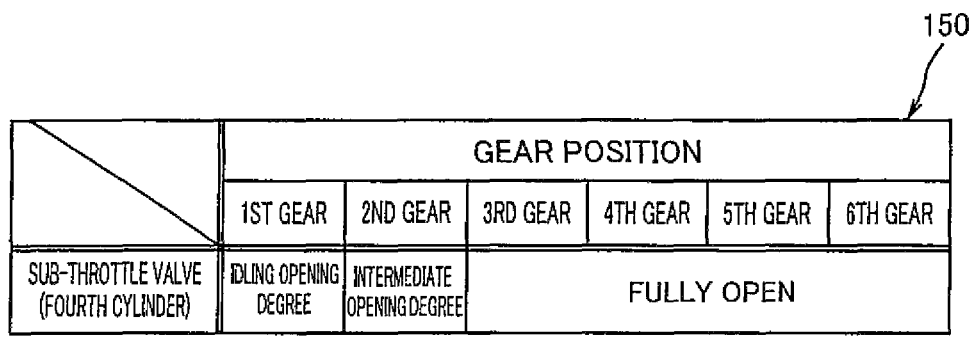
FIG. 15 is a map showing a relationship between opening degrees of a sub-throttle valve and gear positions of a transmission in FIG. 14.

FIG. 15 is a relationship between an opening degree of the sub-throttle valve 124 and the gear position of the transmission 18 in FIG. 14. Referring to FIG. 15, the engine ECU 119 (see FIG. 12) contains a relationship defined by a map 150. The map 150 is defined such that the opening degree of the sub-throttle valve 124 is restricted to a predetermined opening degree or less when the gear position set in the transmission 18 is a value corresponding to a lower speed than (i.e., reduction gear ratio is higher) a predetermined gear position (e.g., 3rd gear). When the gear position is a value corresponding to a lower speed, it is estimated that the motorcycle 1 is in an acceleration preparation state where the motorcycle 1 is more likely to be accelerated, and the driving power of the fourth cylinder is suppressed irrespective of the acceleration command from the driver. To be specific, the opening degree of the sub-throttle valve 124 is decided as a first restricted opening degree which is an idling opening degree (or opening degree closer to the idling opening degree) when the gear position set in the transmission 18 is 1st gear. The opening degree of the sub-throttle valve 124 is decided as a second restricted opening degree which is an intermediate opening degree when the gear position set in the transmission 18 is 2nd gear. The intermediate opening degree is an opening degree larger than the first restricting opening degree and smaller than a maximum opening degree. For example, when a state where the sub-throttle valve 124 has the idling opening degree is represented by 0% and a state where the sub-throttle valve 124 is fully opened is represented by 100%, the intermediate opening degree is set to fall within a range from 20% to 60%. Although in this embodiment, the sub-throttle valve 124 is controlled to have the intermediate opening degree in the 2nd gear, the opening degree of the sub-throttle valve 124 may be variable assuming that the intermediate opening degree is an upper limit opening degree. When the gear position set in the transmission 18 is one of third gear to sixth gear which are relatively high gear positions, the opening degree of the sub-throttle valve 124 is decided to be fully open.

Figure 16:
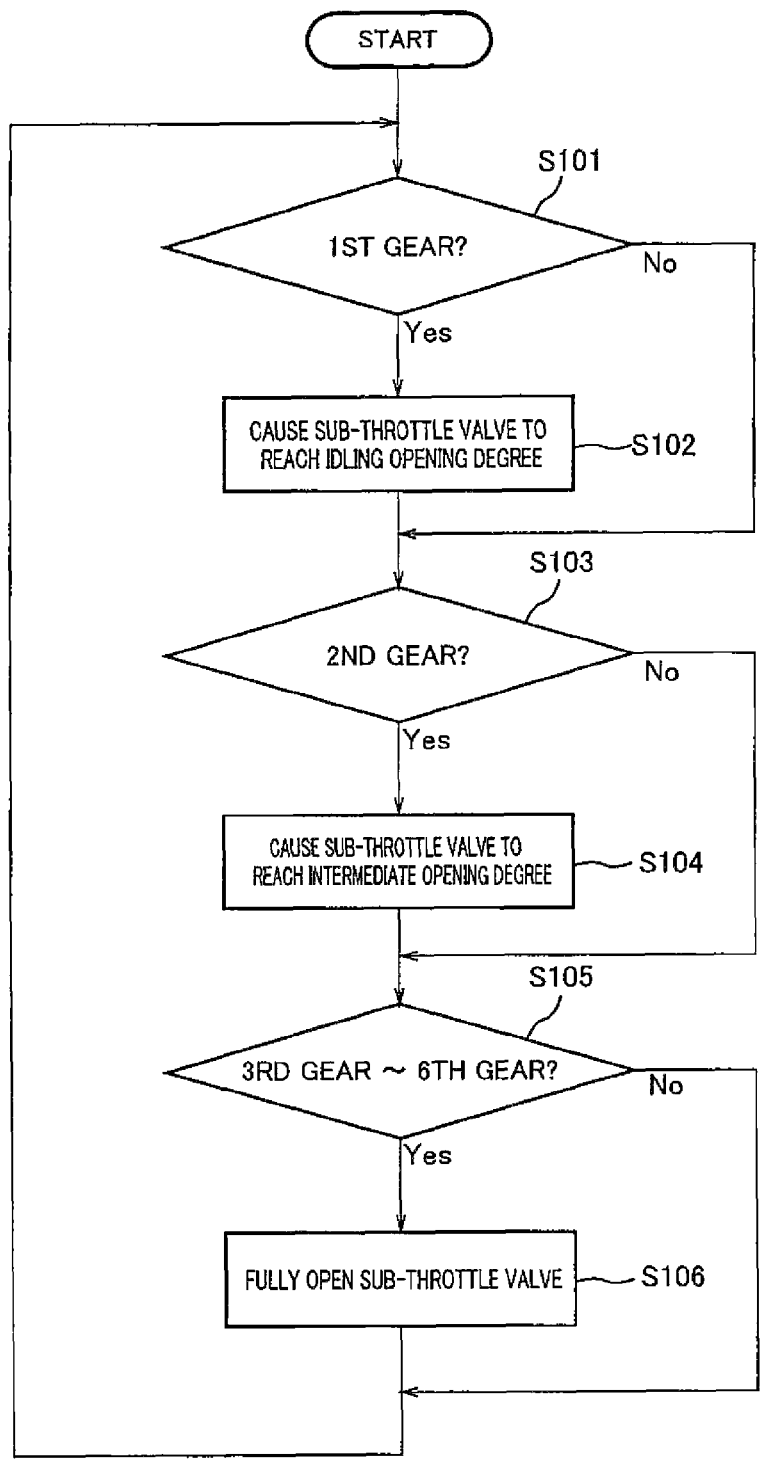
FIG. 16 is a first flowchart showing a driving power control process in the motorcycle in FIG. 12.

FIG. 16 is a first flowchart showing the driving power control process in the motorcycle in FIG. 12. Hereinafter, the engine driving power control will be described with reference to FIG. 16 and FIGS. 12 to 15. Initially, the engine ECU 119 determines whether or not the gear position detected by the gear position sensor 29 is 1st gear (step S101). If Yes in step S101, it is estimated that the engine E is in an acceleration preparation state where the motorcycle 1 is more likely to be accelerated, and the driving power of the fourth cylinder is suppressed. The engine ECU 119 controls the valve actuator 126 with reference to the map 150 in FIG. 16 so that the opening degree of the sub-throttle valve 124 reaches the idling opening degree (step S102). This places the fourth cylinder in a driving power suppressed state, so that the driving power output from the fourth cylinder is smaller than those of the first to third cylinders. In other words, the first to third cylinders are caused to operate in response to the acceleration command input by the driver's operation of the throttle grip 8, and only the fourth cylinder is placed in the driving power suppressed state.

In a case where the main throttle valve 123 is re-opened after the main throttle valve 123 is closed under a high-engine speed condition, and thereby non-combustion occurs in the engine E, the non-combustion state suddenly changes into the combustion state. In accordance with the above configuration, changing from the non-combustion state to a combustion state occurs mainly in the first cylinder to the third cylinder and is less likely to occur in the fourth cylinder. Therefore, a fluctuation in the engine driving power can be reduced in the overall engine E when the engine E is transitioning from the decelerated state to the accelerated state.

To obtain a desired engine driving power when the motorcycle 1 is accelerated in 1st gear position, the first to third cylinders operate in a high driving-power range because the driving power of the fourth cylinder is suppressed as compared to a conventional configuration in which all the cylinders output an equal driving power. By doing so, a high-efficient high driving power range of the first cylinder to third cylinder can be utilized, which increases an energy efficiency in the overall engine E during acceleration. Since a high torque is transmitted from the engine E to the rear wheel 3 in 1st gear position, a wheelie in which the front wheel 2 lifts off the ground, could possibly occur when the motorcycle 1 is rapidly accelerated in 1st gear position. However, occurrence of the wheelie is suppressed because the driving power of the fourth cylinder is suppressed.

Since the driving power in the expansion stroke of the fourth cylinder is suppressed significantly as compared to the driving powers in the expansion strokes of the first cylinder to the third cylinder, the driving powers in the expansion strokes of the first cylinder to the third cylinder mainly form the engine driving power. In that case, the timings when expansion strokes occur in the first to third cylinders are set at unequal intervals (360 degrees, 180 degrees) with respect to the crank angle. Since the fourth cylinder is placed in a driving power suppressed state, a characteristic of an engine configured to perform expansion at unequal intervals results (see FIG. 14). As a result, a drive wheel slip is suppressed and a traction capability of the drive wheel is improved when the gear position set in the transmission 18 is 1st gear and a torque of the rear wheel 3 is high.

If No in step S101 or after step S102, the engine ECU 119 determines whether or not the gear position detected by the gear position sensor 29 is 2nd gear (step S103). If Yes in step S103, the engine ECU 119 controls the valve actuator 126 with reference to the map 150 of FIG. 15 so that the opening degree of the sub-throttle valve 124 reaches the intermediate opening degree (step S104). Since the opening degree of the sub-throttle valve 124 corresponding to 2nd gear is set smaller than an opening degree in a normal control and larger than the opening degree corresponding to 1st gear, an abrupt change of the driving power is suppressed when the gear position is changed from 1st gear to 3rd gear.

If No in step S103 or after step S104, the engine ECU 119 determines whether or not the gear position detected by the gear position sensor 29 is one of 3rd gear to 6th gear (step S105). If Yes in step S105, the engine ECU 119 controls the valve actuator 126 so that the sub-throttle valve 124 is fully opened with reference to the map 150 of FIG. 15 (step S106), and the process returns to step S101.

As described above, the timing when the opening degree of the sub-throttle valve 124 is changed between the idling opening degree, the intermediate opening degree, and the fully open position, is a time point when the gear position set in the transmission 18 is changed. Some impact is generated in the vehicle body when the gear position is changed. The impact generated when the opening degree of the sub-throttle valve 124 is changed, is absorbed by the vehicle body when the gear position is changed, and a good driving feel can be maintained irrespective of a change in the driving power of the fourth cylinder.

Figure 17:
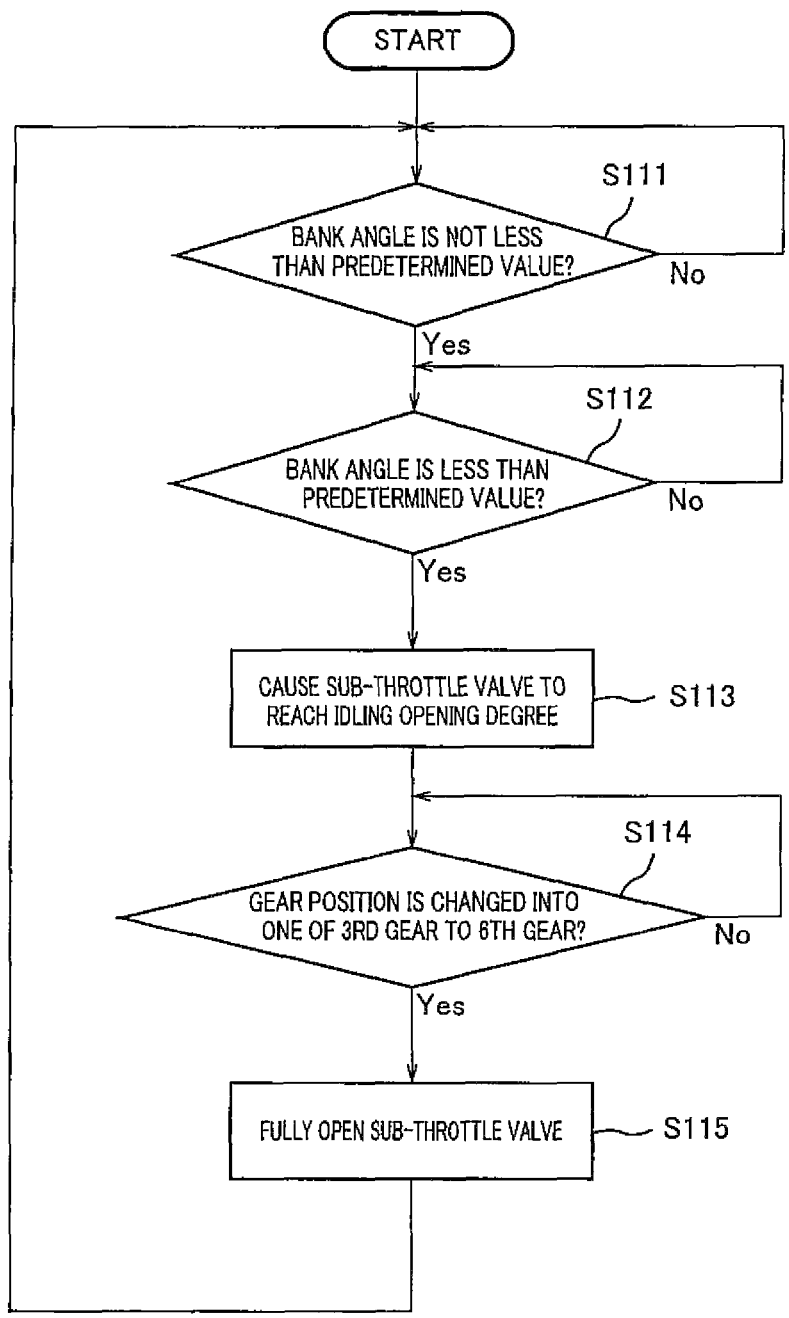
FIG. 17 is a second flowchart showing a driving power control process in the motorcycle in FIG. 12.

FIG. 17 is a second flowchart showing an engine driving power control of the motorcycle 1 of FIG. 12. The second flowchart occurs concurrently with the first flowchart of FIG. 16. Referring to FIG. 17, initially, the engine ECU 119 determines whether or not the bank angle of the vehicle body detected by the bank angle sensor 136 is not less than a predetermined value, i.e., the vehicle body is banked laterally (step S111). If No in step S111, step S111 is repeated. If Yes in step S111, the engine ECU 119 determines whether or not the bank angle of the vehicle body detected by the bank angle sensor 136 is less than a predetermined value (i.e., the vehicle body is in the normal upright position or in a position close to the normal upright position (step S112). If No in step S112, step S112 is repeated.

If Yes in step S111 and S112, it is determined that the vehicle body is banked laterally and then returned to its normal upright position, during, for example, cornering. If Yes in Step S112, the engine ECU 119 controls the valve actuator 126 so that the sub-throttle valve 124 reaches the idling opening degree (step S113). Thereby, when the motorcycle 1 is entering the corner and exiting the corner, the driving power of the fourth cylinder is suppressed. As a result, a drivability is improved when the driver is turning the corner and feeling nervous.

After step S113, the engine ECU 119 determines whether or not the gear position detected by the gear position sensor 29 has been changed into one of the 3rd gear to 6th gear (step S114). If Yes in step S114, the engine ECU 119 controls the valve actuator 126 so that the sub-throttle valve 124 is fully opened (step S115). The timing when the opening degree of the sub-throttle valve 124 is changed from the idling opening degree to the fully open position is a time point when the gear position set in the transmission 18 is changed. Therefore, a fluctuation in the engine driving power occurring when the opening degree of the sub-throttle valve 124 is changed, is absorbed by an impact generated by the gear change. Thus, a good driving feel can be maintained irrespective of a change in the driving power of the fourth cylinder.

Although in this embodiment, the driving power control is made different between a case where the gear position is 1st gear or 2nd gear and a case where the gear position is one of 3rd gear to 6th gear, a driving power suppressed amount may be increased according to an increase in a reduction gear ratio. For example, the same driving power control may be used for 1st gear and 2nd gear, and the driving power suppressed amount may be set stepwisely for 3rd gear to 6th gear. The configuration of this embodiment may be combined with the configurations of Embodiment 1 to Embodiment 5.

Embodiment 7

Figure 18:
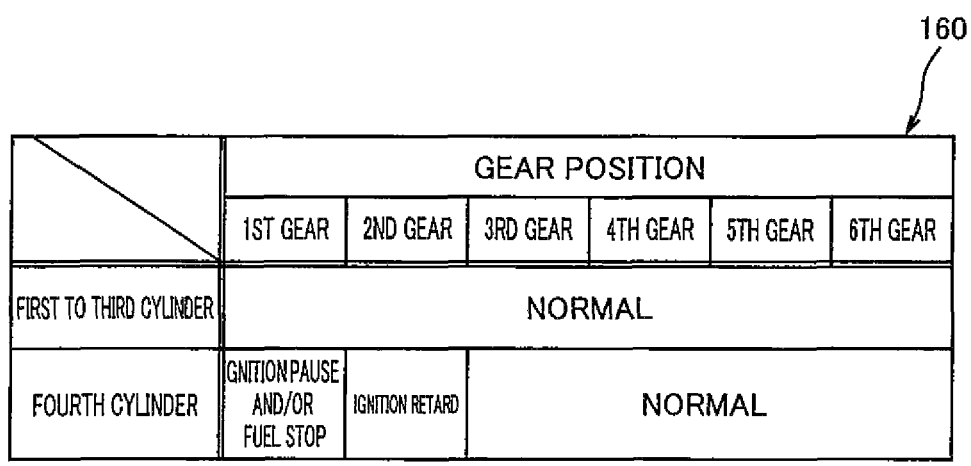
FIG. 18 is a map showing a relationship between expansion strokes of the engine and gear positions of a transmission in a motorcycle according to Embodiment 7 of the present invention.

FIG. 18 is a map 160 showing a correspondence between the expansion strokes of the engine E and the gear positions set in the transmission 18 in the motorcycle 1 according to Embodiment 7. Embodiment 7 is different from Embodiment 1 and Embodiment 2 in that the driving power of the fourth cylinder is suppressed by ignition control and/or fuel control instead of the air-intake amount control. In this embodiment, alternatively, the air-intake amount may not be electronically controlled (e.g., only main throttle valves 123A-123D are provided and the sub-throttle valve 124 is not provided) so long as the ignition control and/or the fuel control can be executed for each cylinder. Hereinafter, the same or corresponding constituents are designated by the same reference numerals and will not be described repetitively.

Referring to FIG. 18, the engine ECU 119 contains a relationship defined by the map 160. The map 160 is defined such that at least one of the ignition timing and the fuel feed amount of the fourth cylinder is controlled to suppress the engine driving power when the gear position set in the transmission 18 is a value corresponding to a lower speed than a predetermined gear position (e.g., 3rd gear), i.e., a reduction gear ratio is higher. For example, when the gear position set in the transmission 18 is 1st gear, at least one of an ignition pause in the expansion stroke and a fuel feeding stop is executed for the fourth cylinder. When the gear position is 2nd gear, the ignition timing of the expansion stroke of the fourth cylinder is retarded. When the gear position is a relatively higher gear position (3rd gear to 6th gear), the expansion stroke of the fourth cylinder occurs normally at a normal ignition timing and with a normal fuel feed amount. Expansion strokes occur normally in the first cylinder to the third cylinder in all of the gear positions.

Figure 19:
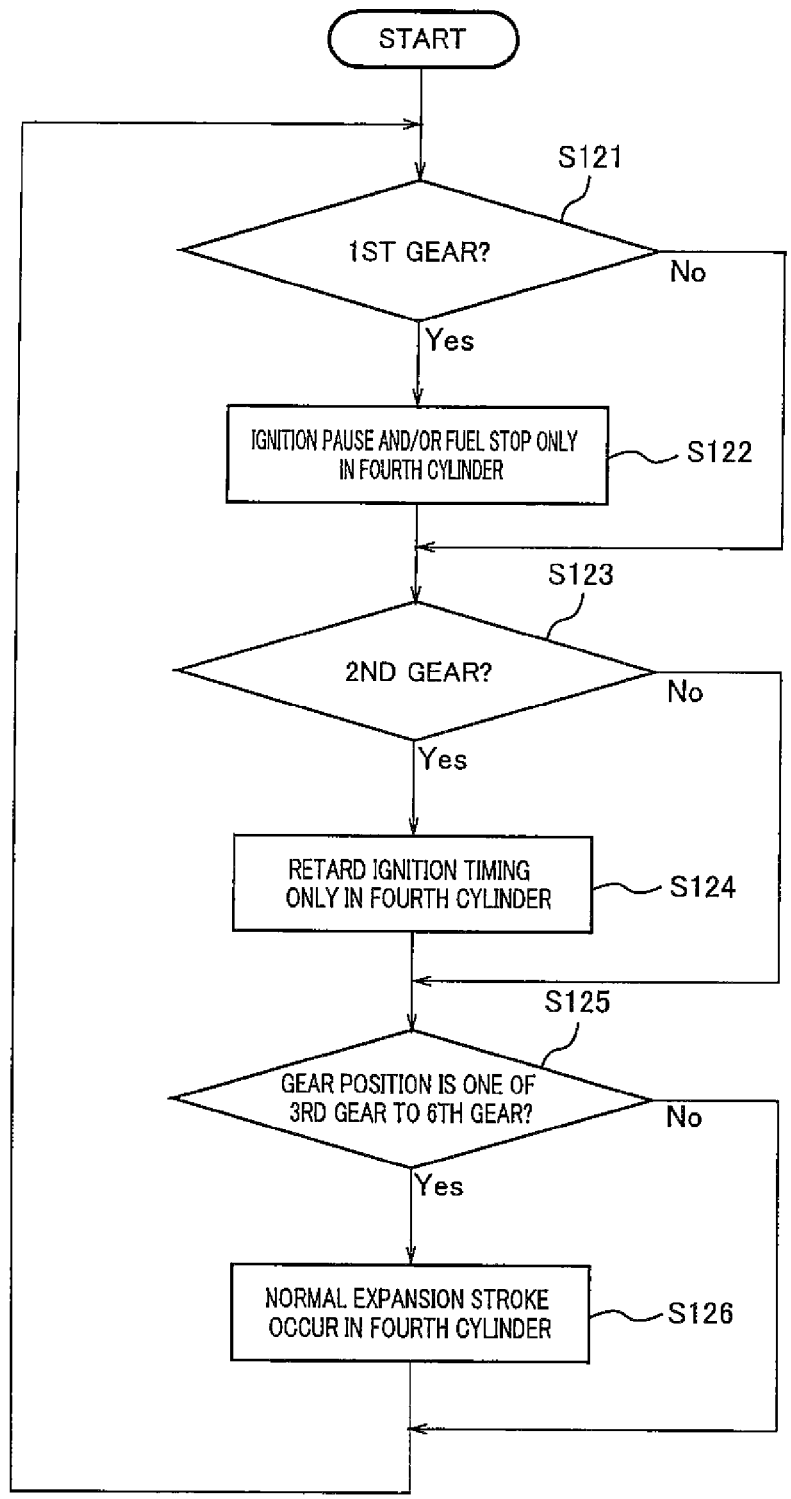
FIG. 19 is a flowchart showing a driving power control process in a motorcycle according to Embodiment 7.

FIG. 19 is a flowchart showing a control in the motorcycle 1 according to Embodiment 7 of the present invention. Initially, upon the engine E starting to run, the engine ECU 119 determines whether or not the gear position detected by the gear position sensor 29 is 1st gear (step S121). If Yes in step S121, it is estimated that the motorcycle 1 is in an acceleration preparation state where the motorcycle 1 is likely to be accelerated, and the driving power of the fourth cylinder is suppressed. To be specific, the engine ECU 119 controls the igniter 27 and/or the injector 26 with reference to the map 160 in FIG. 18 so that at least either one of an ignition pause in the expansion stroke and a fuel feeding stop is executed for the fourth cylinder (step S122). This results in a driving power suppressed state in which the driving power is not generated in the fourth cylinder. In other words, a state where the driving power is generated in response to the acceleration command input by the driver with the throttle grip 8 is maintained in the first cylinder to the third cylinder like a case where the gear position is relatively higher (e.g., 3rd gear-6th gear), and the driving power is not generated only in the fourth cylinder. As a result, like Embodiment 1, a fluctuation in the driving power which would occur when the motorcycle 1 is transitioning from a decelerated state to an accelerated state is suppressed in the overall engine E, an energy efficiency is improved in the overall engine E during low-speed acceleration, occurrence of a wheelie is suppressed, and a traction capability of the drive wheel is improved.

If No in step S121 or after step S122, the engine ECU 119 determines whether or not the gear position detected by the gear position sensor 29 is 2nd gear (step S123). If Yes in step S123, the engine ECU 119 controls the igniter 27 to retard the ignition timing in the expansion stroke of the fourth cylinder, with reference to the map 160 of FIG. 18 (step S124). Since only the ignition timing of the fourth cylinder, corresponding to 2nd gear, is retarded so that the driving power of the fourth cylinder becomes smaller than that in a normal control and larger than that corresponding to 1st gear, an abrupt change of the driving power is suppressed when the gear position is changed from 1st gear to 3rd gear.

If No in step S123 or after step S124, the engine ECU 119 determines whether or not the gear position detected by the gear position sensor 29 is one of the 3rd gear to 6th gear (step S125). If Yes in step S125, the engine ECU 119 controls the igniter 27 and the injector 26 with reference to the map 160 of FIG. 18 so that the expansion stroke of the fourth cylinder occurs normally (step S126), and the process returns to step S21. The other constituents are identical to those of Embodiment 6 and will not be described repetitively.

Other Embodiment

The present invention is not limited to the above embodiments, but alternation, addition or deletion can be made without departing from the spirit of the present invention. For example, although the gear position sensor 29 is used as the driving state detector for detecting whether the driving state of the vehicle is a value corresponding to a lower speed or a higher speed than a predetermined state, the vehicle speed sensor 135 or the throttle valve position sensor 25 may be used for this purpose. When the driving speed or acceleration detected by the vehicle speed sensor 135 is lower than a predetermined value, it may be determined that the driving state is a value corresponding to a lower speed and it may be estimated that the vehicle is in an acceleration preparation state where the vehicle is going to be accelerated. When the throttle valve opening degree detected by the throttle valve position sensor 25 is smaller than a predetermined opening degree, or when the throttle valve opening degree is smaller than a predetermined opening degree and starts increasing, it may be determined that the driving state is a value corresponding to a lower speed and it may be estimated that the vehicle is in an acceleration preparation state where the vehicle is going to be accelerated. It may be determined that a braking operation has ended and the driving state is a value corresponding to a lower speed using the brake pressure sensor or a brake lever position sensor. When a deceleration derived by the acceleration sensor or the vehicle speed sensor reaches or approaches zero, it may be determined that the driving state is a value corresponding to a lower speed. It may be determined that the vehicle has finished turning or has exited a corner using a gyro sensor, and the driving state is a value corresponding to a lower speed.

Although in the above embodiments, the valve actuator 126, the injector 26 and the igniter 27, which are the engine control components, are provided for each individual cylinder, they may be independently controlled for each of a plurality of cylinder groups (e.g., two cylinders). Although the sub-throttle valve 124 is provided to restrict the air-intake amount of the fourth cylinder in Embodiment 6, the sub-throttle valve 124 may be omitted but the main throttle valve 123 may be electronically controlled (electronic throttle control) and the opening degree of the throttle valve 123 may be restricted to restrict the air-intake amount of the fourth cylinder. The engine driving power may be suppressed using the air-intake amount control (see FIG. 15) and the ignition control (see FIG. 18). The number of cylinders may be other than four so long as plural cylinders are provided in the engine.

The driving power of the fourth cylinder may be smaller than the driving powers of the first cylinder to the third cylinder when the driving state detected by the driving state detector is a value corresponding to a lower speed than a predetermined state, as compared to a case where the driving state is a value corresponding to a higher speed. In other words, there may be a difference in driving power between the fourth cylinder and the first cylinder to the third cylinder when the driving state detected by the driving state detector is a value corresponding to a higher speed, too. As a running mode of the engine E, a normal mode for attaining a higher driving power and an economy mode for attaining a higher fuel efficiency may be provided and the control for suppressing the driving power of the fourth cylinder with respect to the driving powers of the first cylinder to the third cylinder may be executed when the user selects the economy mode.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A vehicle comprising:
an acceleration command input device operated by a driver to input an acceleration command;
a braking command input device operated by the driver to input a braking command;
an engine controller for controlling a plurality of engine control components to change an engine driving power of an engine in response to the acceleration command and for executing a deceleration control for reducing the engine driving power when a predetermined deceleration condition is met; and
the engine controller executing a driving power increasing preparation for changing a controlled amount of at least one of the engine control components to increase the engine driving power while maintaining a state of the deceleration control when it is determined that inputting of the braking command stops during the deceleration control, and changing the controlled amount of at least one of the engine control components to increase the engine driving power when it is determined that the acceleration command is input after the driving power increasing preparation;
wherein the engine controller executes the driving power increasing preparation after a lapse of a predetermined delay time after a time point when it is determined that inputting of the braking command stops.

2. The vehicle according to claim 1,
wherein the engine control components include a fuel feeder for controlling fuel feeding to the engine;
wherein the deceleration condition includes a predetermined fuel stop condition;
wherein the deceleration control includes a fuel stop control for stopping fuel feeding to the engine when the predetermined fuel stop condition is met; and
wherein the engine controller causes the fuel feeder to resume fuel feeding to the engine in the driving power increasing preparation, when it is determined that inputting of the braking command stops, during the fuel stop control.

3. The vehicle according to claim 1,
wherein the engine control components include a valve actuator for driving a throttle valve for controlling an air-intake amount to the engine; and
wherein the engine controller causes the valve actuator to increase an opening degree of the throttle valve in the driving power increasing preparation, when it is determined that inputting of the braking command stops, during the deceleration control.

4. The vehicle according to claim 1, further comprising:
a braking amount sensor for detecting a braking amount of the braking command;
wherein the engine controller determines that inputting of the braking command stops when the braking amount detected by the braking amount sensor reaches a value which is not less than a predetermined threshold and then reaches a value less than the predetermined threshold.

5. The vehicle according to claim 1, further comprising:
an anti-lock braking system;
wherein the engine controller determines that inputting of the braking command stops, based on a value detected by a brake pressure sensor in the anti-lock braking system.

6. The vehicle according to claim 1, further comprising:
a driving state detecting sensor for detecting a driving state of the vehicle;
wherein the engine controller decides the predetermined delay time according to a value detected by the driving state detecting sensor.

7. The vehicle according to claim 6,
wherein the driving state includes at least one of a braking amount, a braking amount change rate, an engine speed and a driving speed; and
wherein the engine controller decreases the delay time with an increased value of at least one of the braking amount, the braking amount change rate, the engine speed and the driving speed.

8. The vehicle according to claim 6,
wherein the driving state includes a gear position set in a transmission; and
wherein the engine controller sets the delay time longer when the gear position is $1^{st}$ gear with a highest reduction gear ratio than when the gear position is other than $1^{st}$ gear.

9. The vehicle according to claim 1,
wherein the engine includes a plurality of cylinders; and
wherein the engine controller makes timing when the driving power increasing preparation starts different between the plurality of cylinders.

10. The vehicle according to claim 1, further comprising:
a driving state detector for detecting whether a driving state of the vehicle is a value corresponding to a lower speed or a higher speed than a predetermined state;
   wherein the engine includes a plurality of cylinders;
   wherein the engine control components are provided for each cylinder such that driving powers of the plurality of cylinders are respectively independently controlled; and
   wherein the engine controller for controlling the engine control components such that a driving power of a part of the plurality of cylinders is smaller than a driving power of one or more other cylinders, when it is determined that the driving state detected by the driving state detector is a value corresponding to a lower speed than the predetermined state.

11. The vehicle according to claim 10, further comprising:
a transmission coupled to the engine;
   wherein the driving state detector includes a gear position sensor for detecting a gear position set in the transmission as the driving state; and
   wherein the engine controller controls the engine control components so that a driving power of the part of the cylinders is smaller than the driving power of the one or more other cylinders when the gear position detected by the gear position sensor is a value corresponding to a lower speed than a predetermined position.

12. The vehicle according to claim 10,
wherein the engine controller causes the engine control components corresponding to the part of the cylinders to attain a predetermined driving power suppressed state while maintaining a state where the engine control components corresponding to the one or more other cylinders is operative in response to the acceleration command, when the driving state detected by the driving state detector is a value corresponding to a lower speed than the predetermined state.

13. The vehicle according to claim 12,
wherein the engine control components include a valve actuator for driving a throttle valve for controlling an air-intake amount of a cylinder, an igniter for performing ignition in the cylinder and a fuel feeder for feeding a fuel to the cylinder;
and wherein the predetermined driving power suppressed state is at least one of a state where an opening degree of the throttle valve corresponding to the part of the cylinders is an idling opening degree corresponding to an idling engine speed or a restricted opening degree close to the idling opening degree, a state where ignition pauses in an expansion stroke of the part of the cylinders, and a state where fuel feeding to the part of the cylinders is stopped.

14. The vehicle according to claim 10,
wherein a number of cylinders in the part of the cylinders is less than a number of cylinders among the one or more other cylinders.

15. The vehicle according to claim 10,
wherein the vehicle transmits the engine driving power to a drive wheel;
   wherein expansion strokes of an entirety of the plurality of cylinders are set at equal intervals; and
   wherein expansion strokes of the one or more other cylinders are set at unequal intervals.

16. The vehicle according to claim 10,
wherein the engine controller controls the engine control components such that the driving power of the part of the cylinders becomes smaller as the driving state detected by the driving state detector becomes a value corresponding to a lower speed.

17. The vehicle according to claim 10, further comprising:
a bank angle sensor for detecting a bank angle of a vehicle body which tilts laterally with respect to a substantially upright position of the vehicle body;
   wherein the vehicle is a motorcycle; and
   wherein the engine controller controls the engine control components such that the driving power of the part of the plurality of cylinders is smaller than the driving power of the one or more other cylinders, when the bank angle detected by the bank angle sensor reaches a value which is not less than a predetermined angle and then a value less than the predetermined angle.

18. A method of controlling an engine, comprising:
enacted in an electronic control unit of a vehicle:
   controlling a plurality of engine control components to reduce an engine driving power when a predetermined deceleration condition is met;
   changing a controlled amount of at least one of the engine control components to perform a driving power increasing preparation after a lapse of a predetermined delay time from a time point when it is determined that inputting of a braking command stops, after start of controlling the plurality of engine control components to reduce the engine driving power; and
   increasing a controlled amount of at least one of the engine control components to increase the engine driving power in response to an acceleration command input by a driver, after start of the step of changing the controlled amount of at least one of the engine control components to perform the driving power increasing preparation.

19. The method according to claim 18,
wherein changing the controlled amount of at least one of the engine control components to perform the driving power increasing preparation, includes making the controlled amount different for each driving state of a vehicle.

20. A straddle-type vehicle comprising:
an acceleration command input device operated by a driver to input an acceleration command;
a braking command input device operated by the driver to input a braking command; and
an engine controller for controlling a plurality of engine control components to change an engine driving power in response to the acceleration command and for executing a deceleration control for reducing the engine driving power when a predetermined deceleration condition is met;
   wherein the engine control components include a fuel feeder for controlling fuel feeding to the engine;
   wherein the deceleration condition includes a predetermined fuel stop condition;
   wherein the deceleration control includes a fuel stop control for stopping fuel feeding to the engine when the predetermined fuel stop condition is met and engine speed is not less than a predetermined value; and
   wherein the engine controller executes driving power increasing preparation for changing a controlled amount of at least one of the engine control components to increase the engine driving power while maintaining a state of the deceleration control when it is determined that inputting of the braking command stops during the deceleration control, and changes a controlled amount of at least one of the engine control components to increase the engine driving power when it is determined that the acceleration command is input after the driving power increasing preparation.

21. The straddle-type vehicle according to claim 20, wherein the engine controller determines that inputting of the braking command stops when a braking amount becomes less than a predetermined threshold during braking.

22. The straddle-type vehicle according to claim 20, wherein the engine controller changes the controlled amount of at least one of the engine control components to increase the engine driving power while maintaining non-combustion in an expansion stroke of the engine or while maintaining an engine braking state, as the driving power increasing preparation.

23. The straddle-type vehicle according to claim 20, further comprising a steering handle; wherein the steering handle is provided with the braking command input device.

24. The straddle-type vehicle according to claim 23, wherein the acceleration command input device is provided at a grip of the steering handle and the braking command input device is located in front of the grip.

* * * * *